United States Patent [19]
Pinkerton et al.

[11] Patent Number: 6,124,702
[45] Date of Patent: Sep. 26, 2000

[54] STEP SWITCH CYCLOCONVERTER UTILIZING MULTI-TAP ARMATURE

[75] Inventors: Joseph F. Pinkerton, Austin; David B. Clifton, Leander, both of Tex.

[73] Assignee: Active Power, Inc., Austin, Tex.

[21] Appl. No.: 09/190,944

[22] Filed: Nov. 13, 1998

[51] Int. Cl.[7] .................................................. H02P 9/30
[52] U.S. Cl. ............................... 322/90; 322/46; 322/29; 322/32; 290/40 C
[58] Field of Search ..................... 322/22, 8, 24, 322/25, 32, 29, 46, 90; 290/40 C, 40 E

[56] References Cited

U.S. PATENT DOCUMENTS

| | | | |
|---|---|---|---|
| 3,340,448 | 9/1967 | Thiessen | 318/140 |
| 3,421,071 | 1/1969 | Cassel | 321/26 |
| 3,629,684 | 12/1971 | Christen | 321/7 |
| 3,742,336 | 6/1973 | Bedford | 321/69 R |
| 3,743,921 | 7/1973 | Legg et al. | 323/4 |
| 3,832,625 | 8/1974 | Gyugyi | 322/47 |
| 4,240,135 | 12/1980 | Schaefer, III | 363/43 |
| 4,488,053 | 12/1984 | Cronin | 290/4 C |
| 4,625,160 | 11/1986 | Hucker | 322/32 |
| 4,658,346 | 4/1987 | Templeton | 363/160 |
| 4,673,823 | 6/1987 | Tanaka | 387/11 |
| 4,733,158 | 3/1988 | Marchione et al. | 323/258 |
| 4,808,842 | 2/1989 | Hughes | 307/43 |
| 4,814,967 | 3/1989 | Broughton et al. | 363/160 |
| 4,827,152 | 5/1989 | Farkas | 387/68 |
| 4,843,271 | 6/1989 | Shah | 310/217 |
| 5,521,471 | 5/1996 | Yang | 318/251 |
| 5,625,276 | 4/1997 | Scott et al. | 322/24 |
| 5,633,792 | 5/1997 | Massey | 363/109 |
| 5,748,267 | 7/1998 | Koenig et al. | 363/43 |
| 5,925,999 | 7/1999 | Lakerdas et al. | 318/496 |

*Primary Examiner*—Nicholas Ponomarenko
*Attorney, Agent, or Firm*—Fish & Neave; Robert W. Morris

[57] ABSTRACT

Electrical machine cycloconverter devices are provided that produce output signals in which the frequency, amplitude and phase are independent of rotor speed. The cycloconverters produce highly efficient increased output by providing multi-tap armatures that include multiple armature coils arranged such that at least two coils may be connected in series to an electrical load. Such configurations produce output signals that include multiple distinct voltage amplitude steps. In preferred embodiments, either rotating permanent magnets or field coils in conjunction with rotating steel teeth induce a voltage in the armature coils. The level of induced voltage is determined by the switching sequence of one or more armature coils that are switched ON and OFF in series, parallel, or series and parallel by semiconductor switches. The cycloconverters may be combined with additional components, such as a reciprocating engine and a connection to utility power, to provide a continuous power system, or they may be coupled to an external source of AC power instead of an electrical load and operated as a motor.

51 Claims, 19 Drawing Sheets

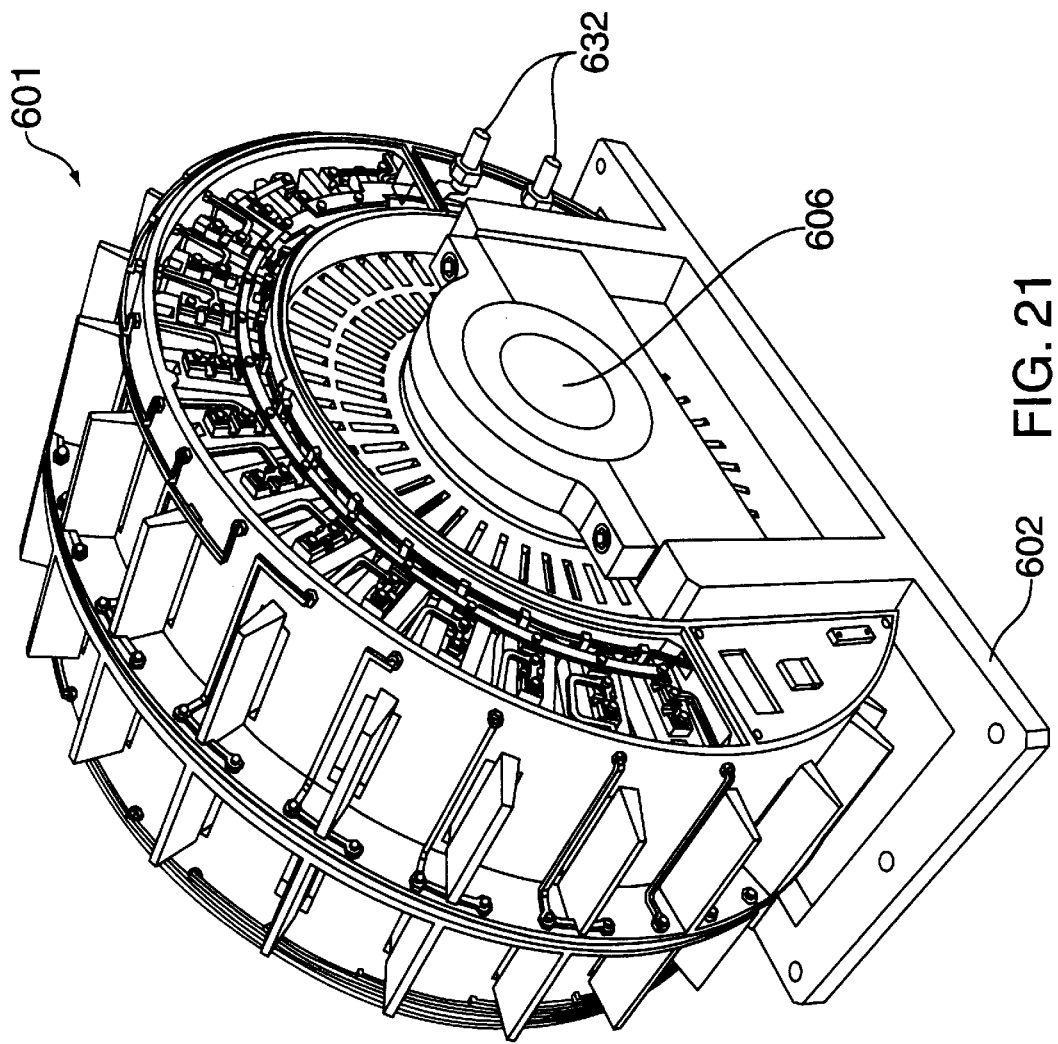

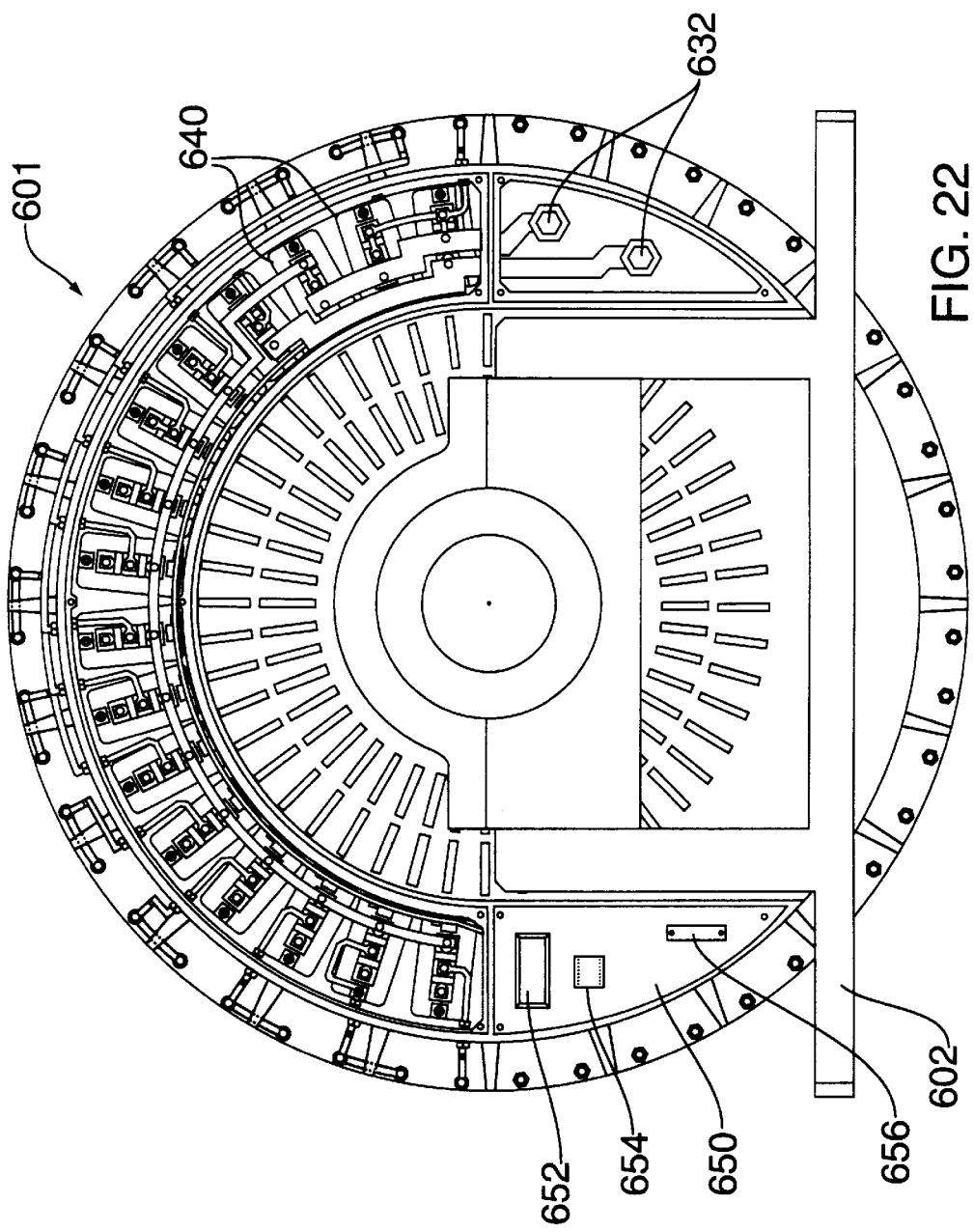

STEP SWITCH CYCLOCONVERTER UTILIZING MULTI-TAP ARMATURE

BACKGROUND OF THE INVENTION

This invention relates to cycloconverter devices, and more particularly to cycloconverter devices used in combination with rotary electrical machines (e.g., motors and generators). The electrical machine cycloconverters of the present invention include a series of semiconductor switches connected to an array of armature coil taps that are used to dynamically control the number of generator armature coils connected to an external AC load, or the number of motor armature coils connected to an external source of power.

Conventional electrical machine cycloconverters have several sources of loss. For example, these devices often exhibit significant armature, semiconductor switch and electrical filtering losses. Excessive armature resistive losses often are produced because load current must flow through all of the armature coils during active operation. Moreover, unnecessary switching losses typically are incurred in conventional cycloconverters because conventional electrical machines cannot precisely regulate their internally generated voltage (beyond simple field control). In addition, the output waveform of conventional electrical machine cycloconverters typically exhibits a high degree of harmonic distortion and thus often require an elaborate electrical filter network. Such filter networks often are expensive, bulky and cause an overall loss of efficiency of the entire system.

One application for known electrical machines is as a component in a continuous power system. Such systems often include a prime mover that is driven by either an AC signal or fuel, a generator coupled to the prime mover that produces power upon rotation by the prime mover, and conversion circuitry that converts the generator output power to useful AC power. For example, Farkas, U.S. Pat. No. 4,827,152 describes an uninterruptible power supply system in which short-term transient power is produced by a flywheel and hydraulically driven motor coupled to an alternator/generator, while long-term transient power is supplied by a diesel engine. As described above, however, variations in the output power of the flywheel/hydraulic supply are inevitable as the device's rotational speed slows down prior to the diesel engine coming on-line. Moreover, such systems are often complicated and expensive due to the fact that they must be designed to handle maximum load conditions, even though such conditions rarely occur (for example, Farkas includes a hydraulic drive for "redundancy for large amperage critical applications").

In view of the foregoing, it is an object of this invention to provide improved electrical machine cycloconverters that efficiently convert a variable speed mechanical input into a highly controllable AC output.

It also is an object of this invention to provide improved electrical machine cycloconverters that efficiently convert an AC electrical input into a highly controllable variable speed mechanical output.

It further is an object of the present invention to provide methods and apparatus for reducing switching losses of electrical machine cycloconverters.

A still further object of this invention is to provide methods and apparatus for reducing armature resistive heating losses of electrical machine cycloconverters.

Another object of this invention is to reduce the electrical filter requirements of electrical machine cycloconverters.

It is an additional object of the present invention to provide methods and apparatus for providing continuous power systems that include isolated motor and generator functions that efficiently produce output power while preventing intermittent utility outages from affecting the load.

SUMMARY OF THE INVENTION

These and other objects of the invention are accomplished in accordance with the principles of the invention by providing various energy conversion devices. The preferred embodiments include a high-efficiency electrical machine cycloconverter utilizing multiple armature coils that may be energized (i.e., connected to an electrical circuit that includes an external AC load when operated as a generator, or connected to an electrical circuit that is driven by an external power source when operated as a motor) in combination with each other. The armature coils for each high frequency (approximately 300–2000 Hz) phase are connected together in series, parallel or a combination of series and parallel, with each pair of armature coils being accessible via a tap between the coils (i.e., the multi-tap armature). Each tap is coupled to a switch that is coupled to the output or input circuitry. In this manner, the preferred embodiments of the present invention operate to dynamically change the internal impedance of the electrical machine and to vary the output voltage that is provided to the external load.

In one generator embodiment, one "end" coil in each phase is provided a direct connection to the output circuitry, while the other "end" coil in the sequence is coupled to the output circuitry via a switch. In this manner, there will be the same number of switches as there are coils for each phase. Thus, the number of coils that provide energy to the output circuitry is controlled by which switch is closed. For example, if the first switch is closed, only the end coil directly connected to the output circuitry provides output energy, and if the last switch (the switch connected to the other end coil) is closed, all of the coils provide energy to the output circuitry.

The advantages of the present invention may be obtained as long as each phase has at least two armature coils connected together in combination with a center tap between them. Those two coils would have two switches coupled between them and the output circuitry (one switch would be coupled between the center tap and the output circuitry, and the other switch would be coupled between one end coil and the output circuitry). For each additional coil, an additional switch is provided so that there may be the same number of switches as there are coils for each phase.

Electrical power is provided to the output circuitry when a switch in the phase is closed, and the voltage component of that power is determined by which switch is closed. For example, if a low voltage is desired at the output, the bottom coil switch is closed (i.e., the switch coupled to the center tap of a "two coil" phase), while a high voltage would be provided by the top coil switch (i.e., the other switch in a "two coil" configuration). Alternately, when the device is operated as a motor, input power is provided through the switches that are operated in a controlled sequence that accurately controls the speed of the motor independent of the AC input frequency.

The output circuitry of the present invention may include rectifier circuitry that combines and rectifies the outputs of each phase to produce a sequence of half-wave pulses, and inverter circuitry that converts the half-wave pulses to substantially a sine wave output. The rectifier circuitry may be formed, for example, from an array of diodes that combines the outputs of each phase and rectifies the combined signal. The inverter circuitry may be formed, for example, from a set of switches that are controlled so that a half-wave input signal is converted to a full-wave output signal (e.g., a sine wave).

In another embodiment of the present invention, an electrical machine cycloconverter utilizing separate motor and generator multi-tap armatures (i.e., one multi-tap armature for the motor and another for the generator) is combined with various other components to form a continuous power system. The electrical machine cycloconverter is coupled to utility power through a set of switches. The utility power is provided to the isolated motor armature that drives the rotor at a substantially constant speed (such as, for example, 3600 rpm) to store kinetic energy. In addition, the rotating rotor of the motor is also used to drive the isolated generator armature to provide power at a substantially constant low frequency (such as, for example 50 or 60 Hz) to a critical load. One advantage of such a configuration is that "glitches" or minor interruptions of line power are isolated from the critical load.

The electrical machine cycloconverter also is coupled to an engine that is not operated while utility power is present. When utility power fails, the stored kinetic energy of the rotor continues to provide power to the critical load while the engine is started up. As the rotor slows down, the switching sequence and field coil current can be adjusted to maintain a substantially constant electrical output. Upon the resumption of utility power, the motor re-accelerates the rotor to about 3600 rpm and the engine is automatically turned off.

Other embodiments of the present invention include varying the number of turns per armature coil to better mimic the changing slope of the desired sine wave output signal. Alternately, the time period between successive voltage steps can be reduced during the steeper portions of the sine wave (when the slope is the greatest), so that the number of turns can be the same in each armature coil.

Further features of the invention, its nature and various advantages will be more apparent from the accompanying drawings and the following detailed description of the preferred embodiments.

BRIEF DESCRIPTION OF THE DRAWINGS

FIG. 21 is a three-dimensional perspective view of the electrical machine cycloconverter of FIG. 20; and FIG. 22 is a side view of the electrical machine cycloconverter of FIG. 20.

DETAILED DESCRIPTION OF THE PREFERRED EMBODIMENTS

Figure 1:
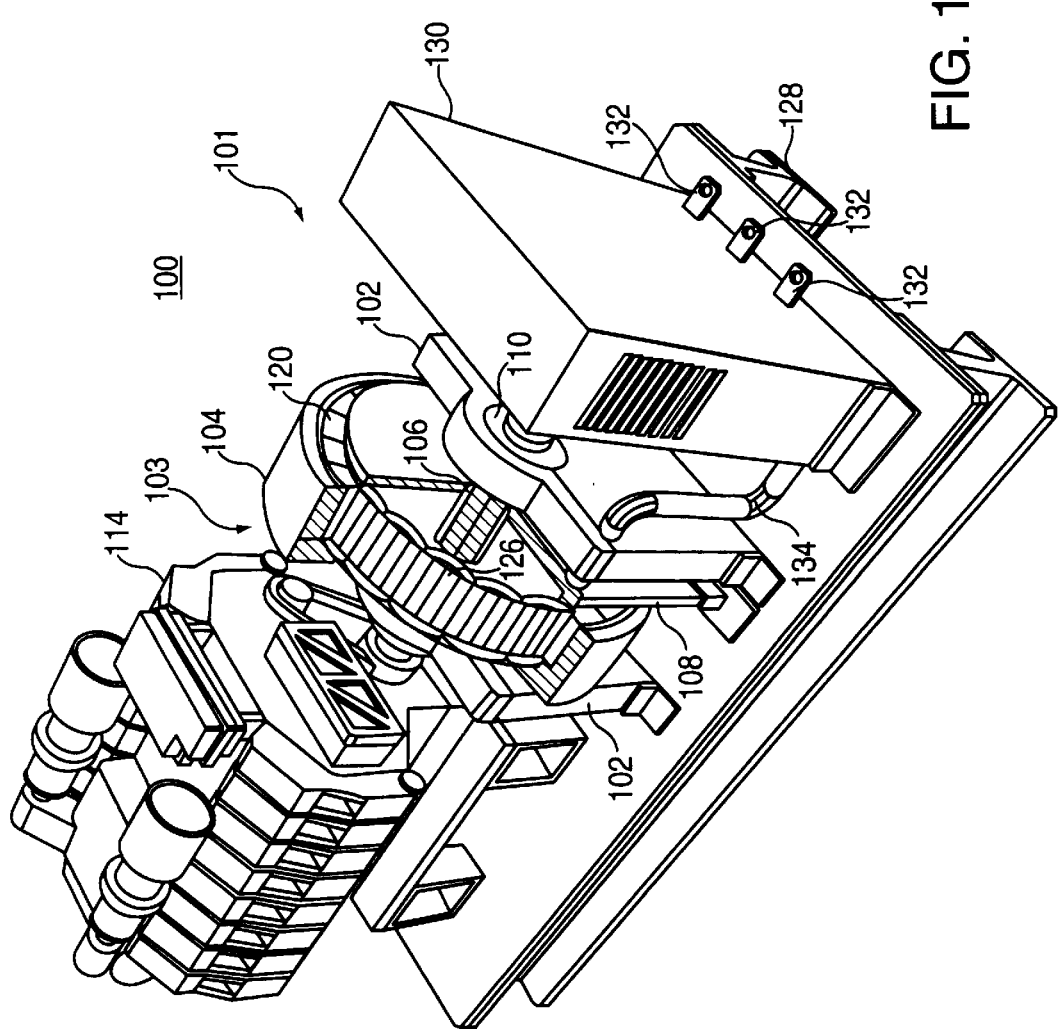
FIG. 1 is a three-dimensional, partial-cutaway, perspective view of an electrical machine cycloconverter constructed in accordance with the principles of the present invention.
Figure 2:
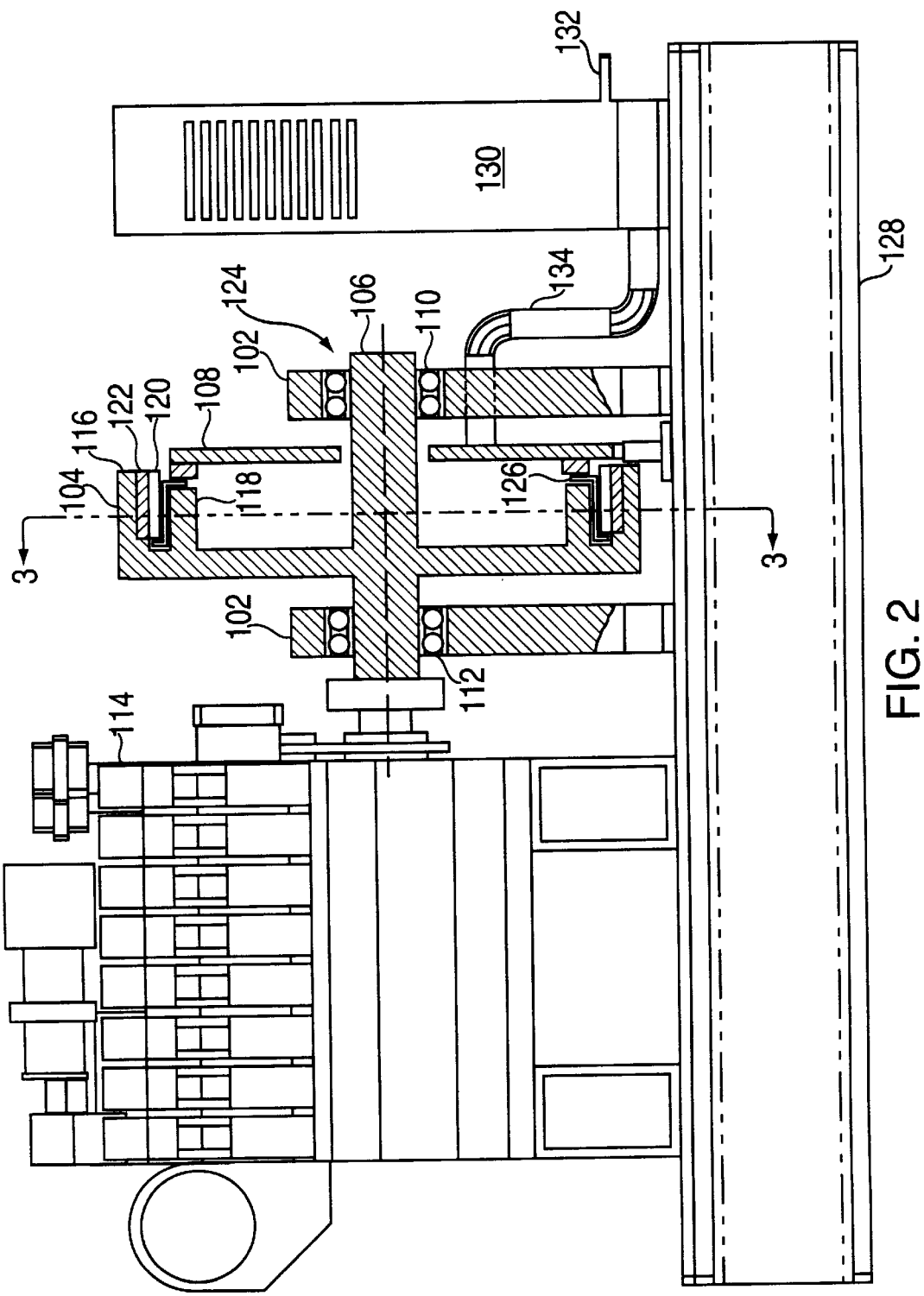
FIG. 2 is a cross-sectional view of the electrical machine cycloconverter of FIG. 1.

FIGS. 1 and 2 show a three-dimensional perspective view of electric power generation system 100 constructed in accordance with the principles of the present invention. Power generation system 100 includes electrical machine cycloconverter 101 and prime mover 114. Cycloconverter 101 includes electrical machine 103 and electronics module 130. Electrical machine 103, which may be mounted on frame 102, includes rotor 104 having a shaft 106, stationary assembly 108 and bearings 110 and 112 (bearing 112 is shown in FIG. 2). Rotor 104 is rotated on shaft 106 about an axis by a prime mover such as reciprocating engine 114 (persons skilled in the art will appreciate that any prime mover could be used to rotate shaft 106).

Rotor 104 preferably includes outer ring 116 and inner ring 118 that are formed from a high permeability material such as steel. It also is preferable that shaft 106, outer and inner rings 116, 118, and the material connecting them all together be formed as a single, integrated unit (e.g., by casting or by milling a single block of high strength steel).

Moreover, it is preferred that a series of permanent magnets 120 be fixed to one of rings 116, 118 (while magnets 120 are shown in FIG. 1 to be fixed to outer ring 116, persons skilled in the art will appreciate that they could instead be affixed to inner ring 118). Steel ring 122 is an optional ring that may be utilized for ease of assembly. When ring 122 is included, magnets 120 may be mounted to ring 122 in any conventional manner, for example, with epoxy, so that the magnets may be inserted and removed from the main rotor quickly and easily.

Bearings 110 and 112 are each mounted in a bearing cartridge 124 that is preferably removable to provide easy access for maintenance. Bearing cartridges 124 are mounted to frame 102 to provide stability during operation.

Figure 3:
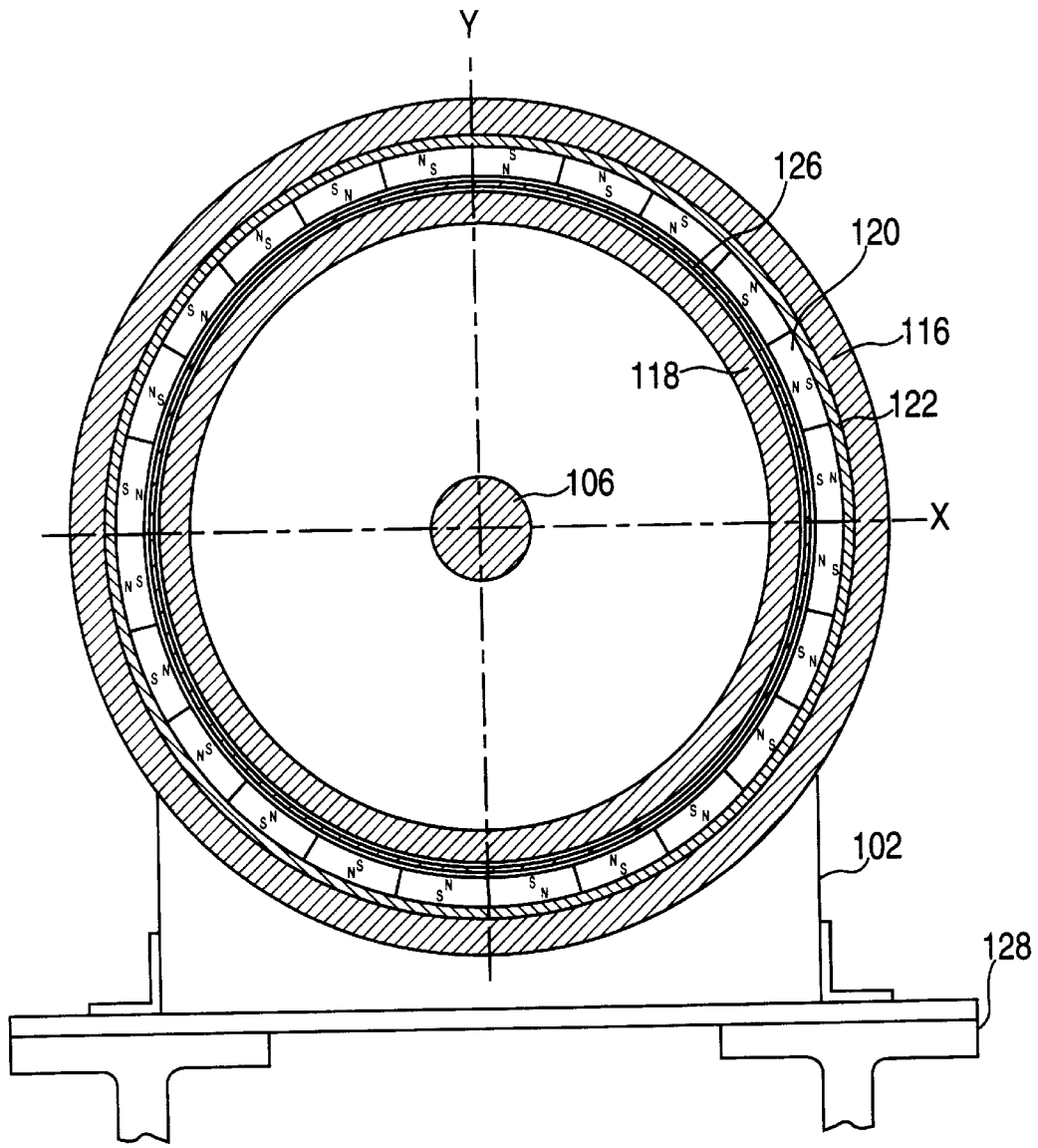
FIG. 3 is a cross-sectional view of the electrical machine cycloconverter of FIGS. 1 and 2 taken along line 3—3.

The construction of electrical machine 103, including the composition of stationary assembly 108, may be more readily apparent by referring to FIGS. 2 and 3, two cross-sectional views of the device of FIG. 1. Stationary assembly 108 includes multiple armature coils 126 that preferably are non-magnetic armature coils that may be preformed and potted within an epoxy structure that provides terminals (not shown) for connection to each of coils 126. As is apparent from FIGS. 1 and 2, coils 126 are preferably Z-shaped coils that are interleaved in layers such that the legs of the two coils below a given coil appear in the "window" of the given coil. Coils 126 are mounted to stationary assembly 108 and in relation to rotor 104 such that they are located between rotating magnets 120 and inner ring 118 (or outer ring 120, if an alternate configuration was utilized).

Persons skilled in the art will appreciate that almost any generator or motor could be used to take advantage of the principles of the present invention, provided that at least two armature coils per phase are used as described herein. However, it should also be apparent that a generator or motor employing a non-magnetic armature is preferred due to its increased efficiency over conventional, iron-core armatures. Moreover, while a permanent magnet array is utilized to produce a magnetic flux in the air gap wherein coils 126 are mounted, it should be understood that the magnetic flux could, instead, be produced by one or more field coils, or a combination of permanent magnets and field coils.

As shown in FIGS. 1 and 2, assembly 108 includes a total of thirty-six armature coils 126. Although thirty-six armature coils 126 are shown in FIGS. 1 and 2, persons skilled in the art will appreciate that various other configurations may be utilized without departing from the scope of the present invention. If the desired device is a three-phase device, the total number of armature coils should be divisible by three in order to maintain proper phase alignment.

In accordance with the principles of the present invention, each armature requires a minimum of two coils connected in series to obtain the advantages of the present invention. The series connected armature coils preferably include terminals that provide access to nodes formed between each pair of coils (as is more readily apparent from FIGS. 4a and 4b). The terminals are connected to switches that control how many of the coils are utilized in producing the output signal at any given time. By varying the number of coils that are energized (i.e., connected to an electrical circuit that includes an external AC load during generator operation or is connected to an electrical circuit that is driven by an external power source during motor operation), the internal impedance of the machine is dynamically changed and the output voltage also is varied. By controlling the sequence of the switches, an alternating current (AC) output signal (preferably shaped like a sine wave) can be produced at greater efficiency than with conventional circuits because of the reduction in losses related to the armature, switches, filters and the switching of the switches, as is explained in more detail below with respect to FIGS. 4A and 4B.

The complete system shown in FIGS. 1 and 2 also includes a frame 128 that electrical machine 103, mounts 102, engine 114 and electronics 130 are mounted to. Electronics 130 includes the switches that are connected to armature coils 126, and rectifier, inverter and control circuitry that are shown in FIG. 4 and described in more detail below. Electrical machine 103 optionally may provide any number of phases of output power. As shown in FIG. 1, electrical machine 103 provides three phase output power via terminals 132 connected to electronics 130. Moreover, electronics 130 is connected to armature coils 126 via, for example, cable 134.

Figure 4A:
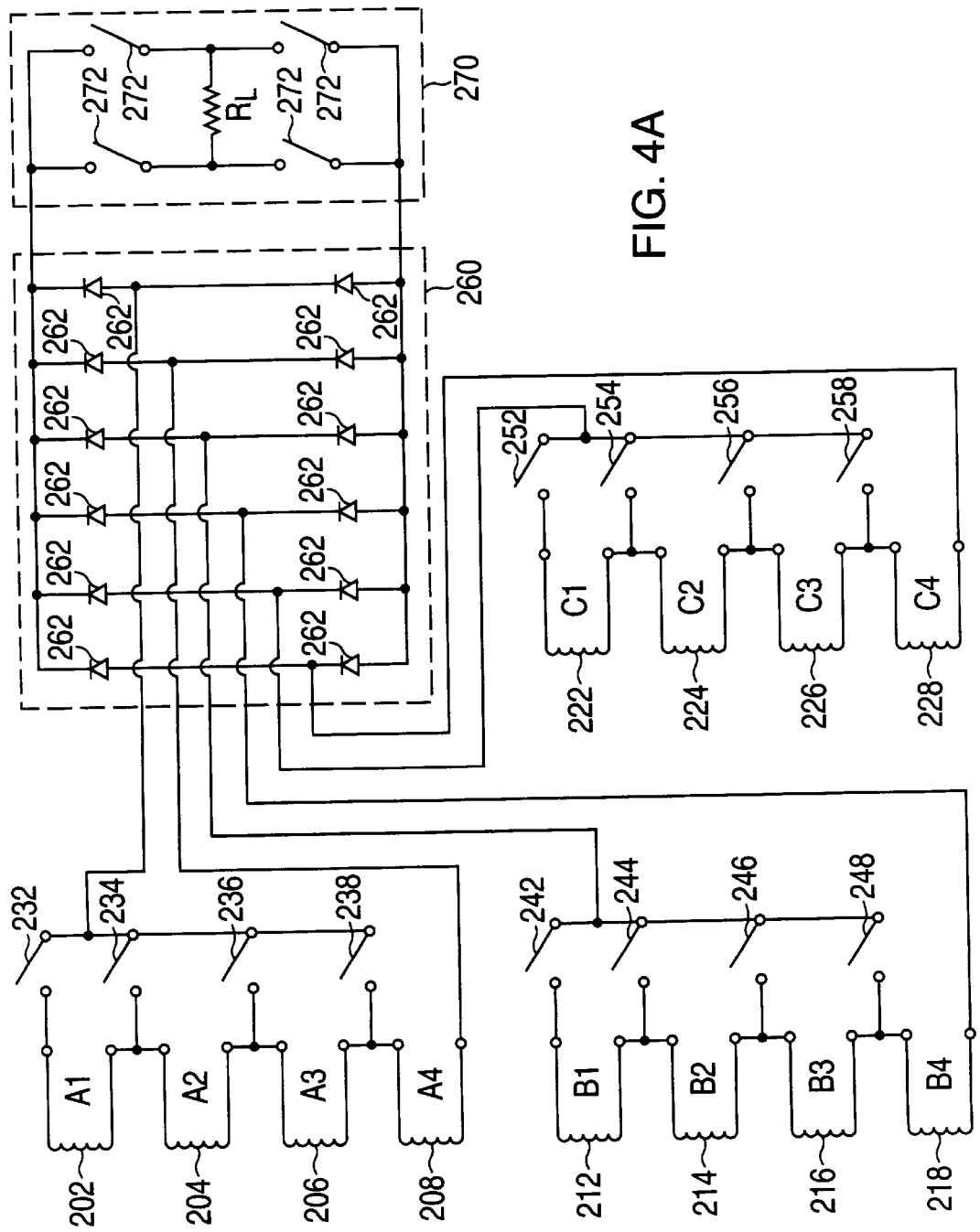
FIGS. 4A, 4B and 4C are schematic diagrams of alternate embodiments of a portion of the electrical machine cycloconverter of FIG. 1.
Figure 4B:
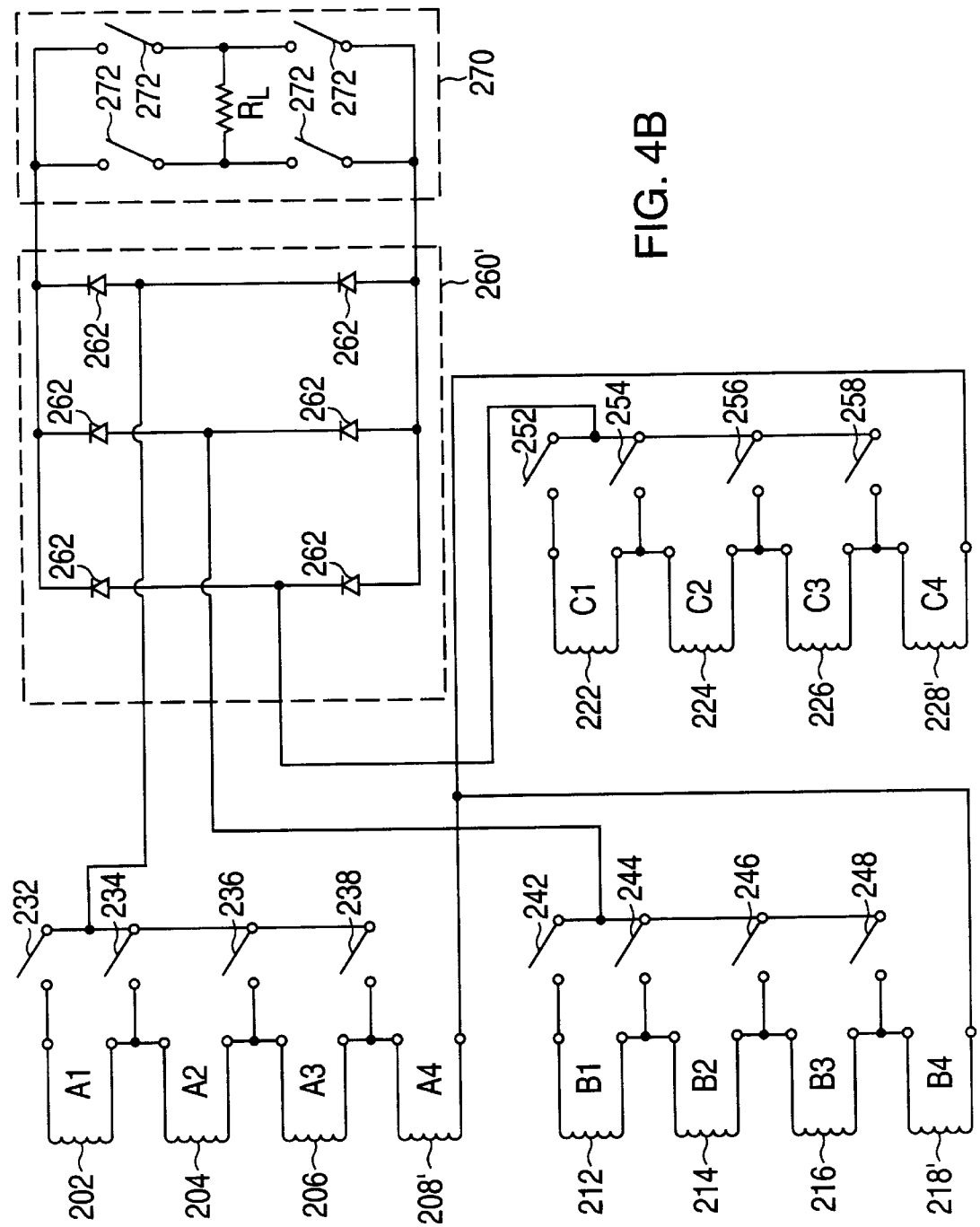
Figure 4C:
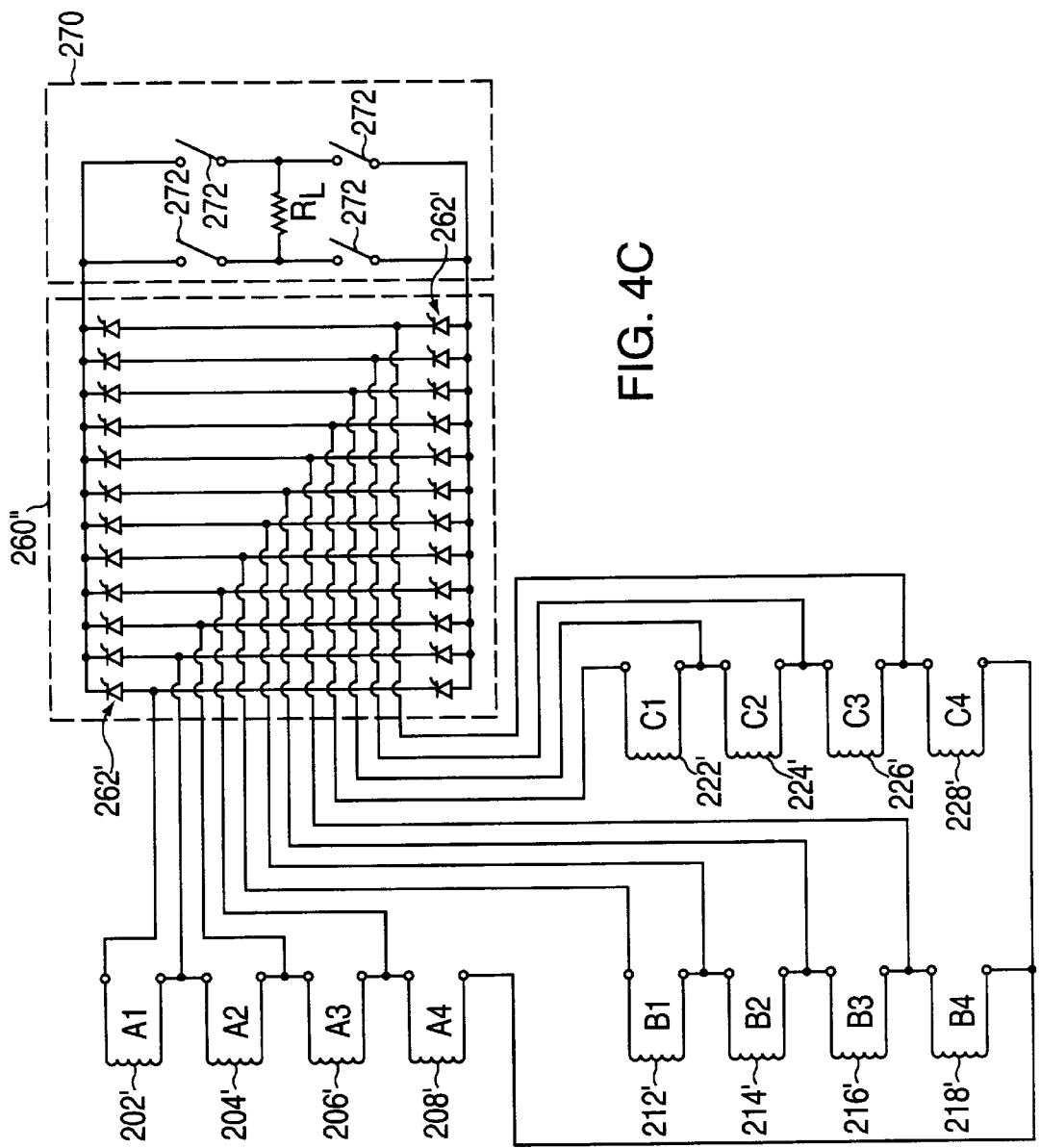

FIGS. 4A, 4B and 4C (collectively referred to as FIG. 4) show various alternate embodiments of a representative portion of electronics 130 of system 100 of FIGS. 1–3. The particular electronics shown in FIG. 4 includes only twelve of the thirty-six coils 126 shown in FIGS. 1–3, while providing a complete output signal for a single phase output. The twelve coils 126 shown in FIG. 4 are divided into three sets of four coils that represent three phases: A, B and C. Coils 202–208 correspond to phase A (coil 208' replaces coil 208 in FIGS. 4B and 4C, and coils 202'–206' replace coils 202–206 in FIG. 4C); coils 212–218 correspond to phase B (coil 218' replaces coil 218 in FIGS. 4B and 4C, and coils 212'–216' replace coils 212–216 in FIG. 4C); and coils 222–228 correspond to phase C (coil 228' replaces coil 228 in FIGS. 4B and 4C, and coils 202'–206' replace coils 202–206 in FIG. 4C) (all of coils 202–228 are similar to coils 126 previously described).

As previously described, only two coils per phase are required for the present invention, however, it presently appears that the cost/complexity of additional coils beyond four per phase may begin to outweigh the benefits of additional coils at about four coils per phase. Each set of coils provides a relatively high frequency (for example, on the order of about 300–2000 Hz), while the output signal is a relatively low frequency signal (on the order of 0–100 Hz).

One primary difference between FIG. 4A and FIGS. 4B and 4C is that coils 208, 218 and 228 of FIG. 4A each have one end coupled to rectifier circuitry 260, while coils 208', 218' and 228' of FIGS. 4B and 4C each have one end coupled to each other. Each configuration, as is described in more detail below, provides advantages and disadvantages when compared with the other.

As shown in FIG. 4, each set of armature coils are connected together in series with each pair of coils having an access node therebetween. In FIGS. 4A and 4B, each access node is connected to a switch (i.e., switches 234–238, 244–248 and 254–258), as is one of the outermost coils in each set (i.e., coil 202 to switch 232, coil 212 to switch 242 and coil 222 to switch 252). In FIG. 4A, the other outermost coil is connected directly to the output circuitry as is described below, while in FIG. 4B, the other outermost coils are coupled together. For example, coils 202–208 are connected to switches 232–238; coils 212–218 are connected to switches 242–248; and coils 222–228 are connected to switches 252–258.

Switches 232–258, which preferably are back-to-back SCRs, are connected to rectifier circuitry 260 that may include any known circuitry capable of combining and rectifying the three phase input signals received from the three sets of armature coils 202–228. Persons skilled in the art will appreciate that the armature coil switches of the present invention are essentially redundant in that any one switch could fail without disrupting the basic function of the device. For example, if switch 236 became disabled, the resultant waveform, while being less than perfect, would still likely be effective to drive the electrical load.

As shown in FIG. 4, rectifier circuitry 260 includes several diodes 262 formed into an array (FIG. 4A shows twelve diodes, FIG. 4B includes only six, and FIG. 4C includes twenty-four unidirectional thyristors 262' (SCRs) instead of diodes 262 and switches 232–258). The rectified output is provided to inverter circuitry 270 that also may include any known circuitry capable of inverting the rectified signal to provide a single phase AC output signal. As shown, inverter circuitry 270 includes four switches 272 that are connected together and sequenced to provide the single phase AC output to load $R_L$. Switches 272 preferably are unidirectional SCRs (or thyristors).

System 100 is operated by having prime mover 114 rotate rotor 104 (including permanent magnets 120) at constant or variable speed. The rotation, combined with the permanent magnetic field, induces a voltage in coils 202–228. During the zero voltage crossing of the desired sinusoidal output half-wave, or if no power is to be applied to the electrical load, all of switches 232–258 remain OPEN. During the low voltage portion of the desired sinusoidal output half-wave, any of switches 238, 248 or 258 may be closed at an appropriate time to apply timed pulses to the electrical load thereby constructing the appropriate low voltage portion of the desired sinusoidal output half-wave. As the voltage of the desired output half-wave increases, any of switches 236, 246 or 256 may be closed at the appropriate time to construct a higher voltage portion of the half-wave. Still higher voltage portions of the output half-wave are constructed by appropriately closing any of switches 234, 244 or 254. At the peak voltage portion of the desired sinusoidal output half-wave, any of switches 232, 242 or 252 may be appropriately closed.

In contrast to the circuitry of FIG. 4A, the circuitry of FIG. 4B produces a more precise output signal using the same number of coils. For example, the circuitry of FIG. 4A produces an output having only four discrete voltage steps, while the circuitry of FIG. 4B produces an output having seven discrete voltage steps. Alternately, less coils and switches per phase could be used to produce a lower resolution output signal (e.g., three coils/switches per phase yields five steps and two coils/switches per phase yields three steps). As shown in FIG. 4B, the fourth armature coils are all coupled together in a wye configuration (such that each fourth coil shares a common node). This results in three different phased resultant waveforms, each 120 degrees out of phase of the other. In this manner, the highest available voltage of each of the output waveforms is the square root of three times the peak voltage obtained when configured as shown in FIG. 4A. Moreover, because of the common wye node, a standard three-phase rectifier bridge having six diode may be used in rectifier circuitry 260', instead of the twelve diode configuration of rectifier 260.

One advantage of the circuitry of FIG. 4A versus the circuitry of FIG. 4B is that the FIG. 4A circuit works with fewer semiconductor switches turned ON simultaneously, thereby reducing the associated semiconductor conduction losses. For example, the circuitry of FIG. 4B requires that at least two switches be turned ON for any output to occur—because each output phase requires current from two high frequency armature phases, each of which requires a switch to be turned ON. However, the requirement of an extra switch enables the circuitry of FIG. 4B to provide more output voltage steps with the same number of armature coils, and thus, to provide an output signal having a higher resolution (i.e., that more accurately follows a sine wave or other desired AC waveform). The higher resolution also allows fewer coils to be conducting at some times, reducing average coil conduction losses.

FIG. 4C, on the other hand, shows another preferred embodiment of an electrical machine cycloconverter switching arrangement that will be apparent to persons skilled in the art based on the discussion above of FIGS. 4A and 4B. In FIG. 4C, switches 232–258 are shown as thyristors (or SCRs) 262' and are included within switching circuitry 260". Persons skilled in the art, however, will appreciate that thyristors 262' could be any kind of controllable semiconductor switch, such as a transistor.

One advantage of the configuration shown in FIG. 4C is that it does not require any passive diodes (i.e., diodes 262), while using the same number of active switches as the circuitry of FIG. 4B to achieve the same switching resolution. The elimination of diodes 262 results in a reduction of the number of semiconductor conduction losses, as well as a reduction in the cost of the electronics. It should be noted that each of switches 232 through 238, 242 through 248 and 252 through 258, shown in FIGS. 4A and 4B are each comprised of two semiconductor devices oriented for conduction of current in opposite directions. The voltage step resolution obtained in FIG. 4C is the same as that obtained in FIG. 4B—7 steps per phase—as opposed to that of FIG. 4A—only 4 steps per phase.

It also should be noted that the circuit of FIG. 4C also is preferred for motoring, in which case inverter switches 272 may be used for modulation of the input power source, which can be a DC power supply or a source of either high or low frequency AC. For some input waveforms, the four inverter switches 272 must be transistors or other devices capable of being turned OFF while conducting current. These devices can include, for example, thyristors if a means of forced commutation is provided.

Figure 5:
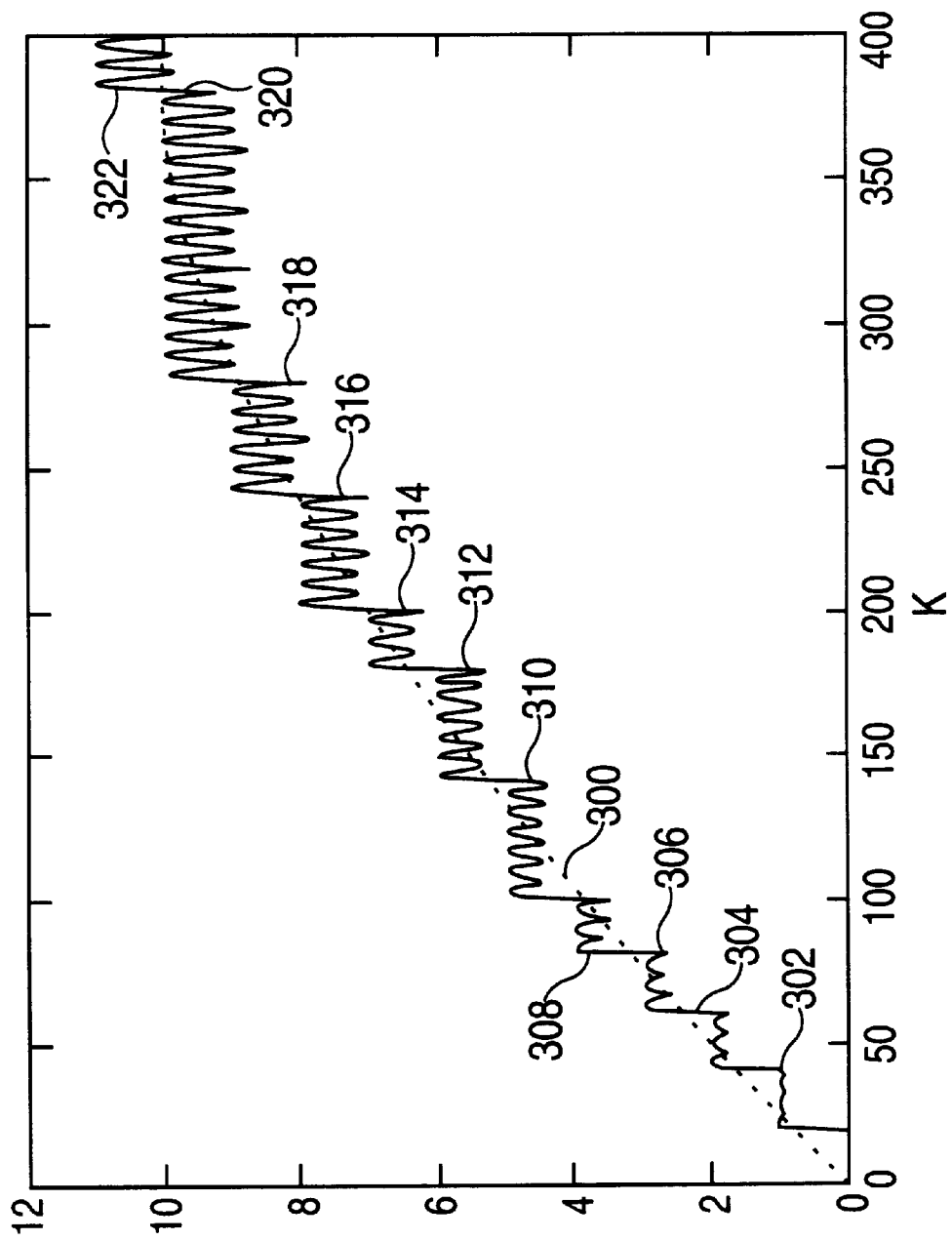
FIG. 5 is a graph showing a representative output signal of one-quarter of the output signal of an electrical machine cycloconverter constructed in accordance with the principles of the present invention.

FIG. 5 shows a graphical representation of one-quarter of an ideal sine wave 300 overlaid by the unfiltered output of an electrical machine cycloconverter constructed and operated in accordance with the present invention. The unfiltered output signal shown in FIG. 5 includes eleven different voltage levels 302–322, or steps, that are produced by utilizing at least eleven coils and switches in each phase of an electronics module (for example, while FIG. 4a shows four coils and switches in each phase, eleven would be required to produce the eleven steps shown in FIG. 5). Persons skilled in the art will appreciate that fewer switches and coils could be used to produce the eleven steps using the general architecture shown in FIG. 4C (for example, six coils per electrical machine phase could be used instead of the eleven described above). FIG. 5 clearly shows the high frequency component of the electrical machine cycloconverter waveform, as well as the individual step increases in output voltage. As previously described, the steps are produced by controlling the switching sequence to mimic, for example, an ideal sine wave. Moreover, the amplitude, frequency and phase of the low frequency output signal also may be determined by the number of coils and switching sequence.

Figure 6:
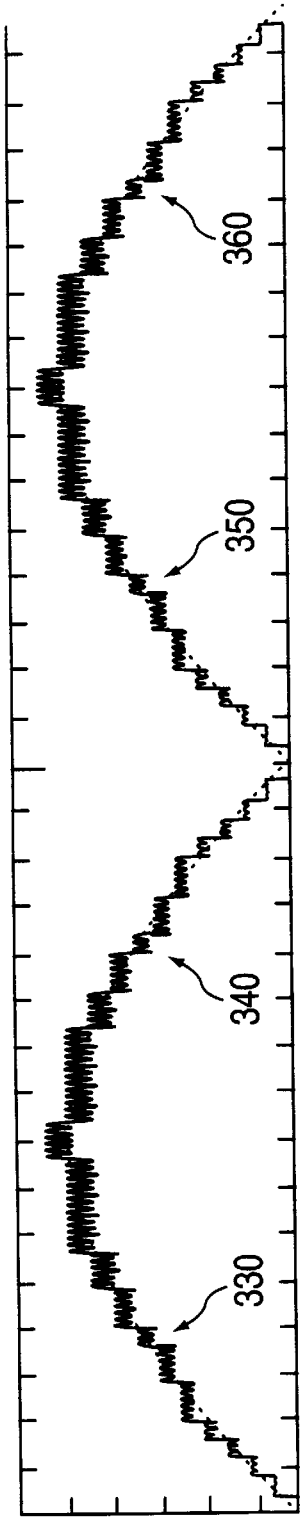
FIG. 6 is a graph showing a complete, non-inverted, output signal of an electrical machine cycloconverter constructed in accordance with the principles of the present invention.
Figure 7:
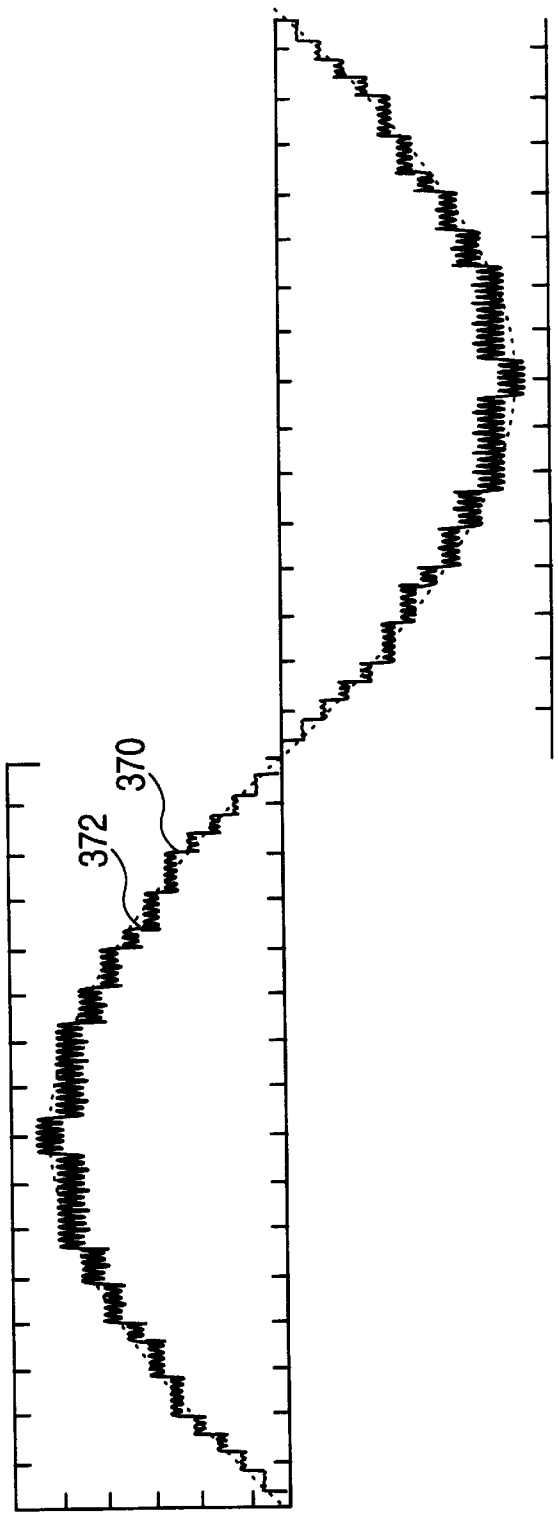
FIG. 7 is a graph showing the output signal of FIG. 6 after it has been inverted.

FIGS. 6 and 7 show further details of the output of an electrical machine cycloconverter constructed in accordance with the present invention. In particular, FIG. 6 generally shows the one-quarter output signal of FIG. 5 as arc 330 and the other three-quarters of the output signal as arcs 340, 350 and 360. The resultant signal represents a complete, eleven step signal that has been processed by the rectifier circuitry. The resultant signal is then processed by the inverter circuitry to produce the complete, inverted signal 370 shown in FIG. 7. It should be apparent from comparing curve 370 to ideal sine wave 372 that the inverted signal closely approximates an ideal sine wave. As described previously, inverted signal 372 is produced by controlling the sequence of the switches so that, for example, the signals corresponding to the higher slope of the sine wave are of a shorter duration and have a greater frequency of steps than the signals corresponding to the shallower slope of the sine wave.

Figure 8:
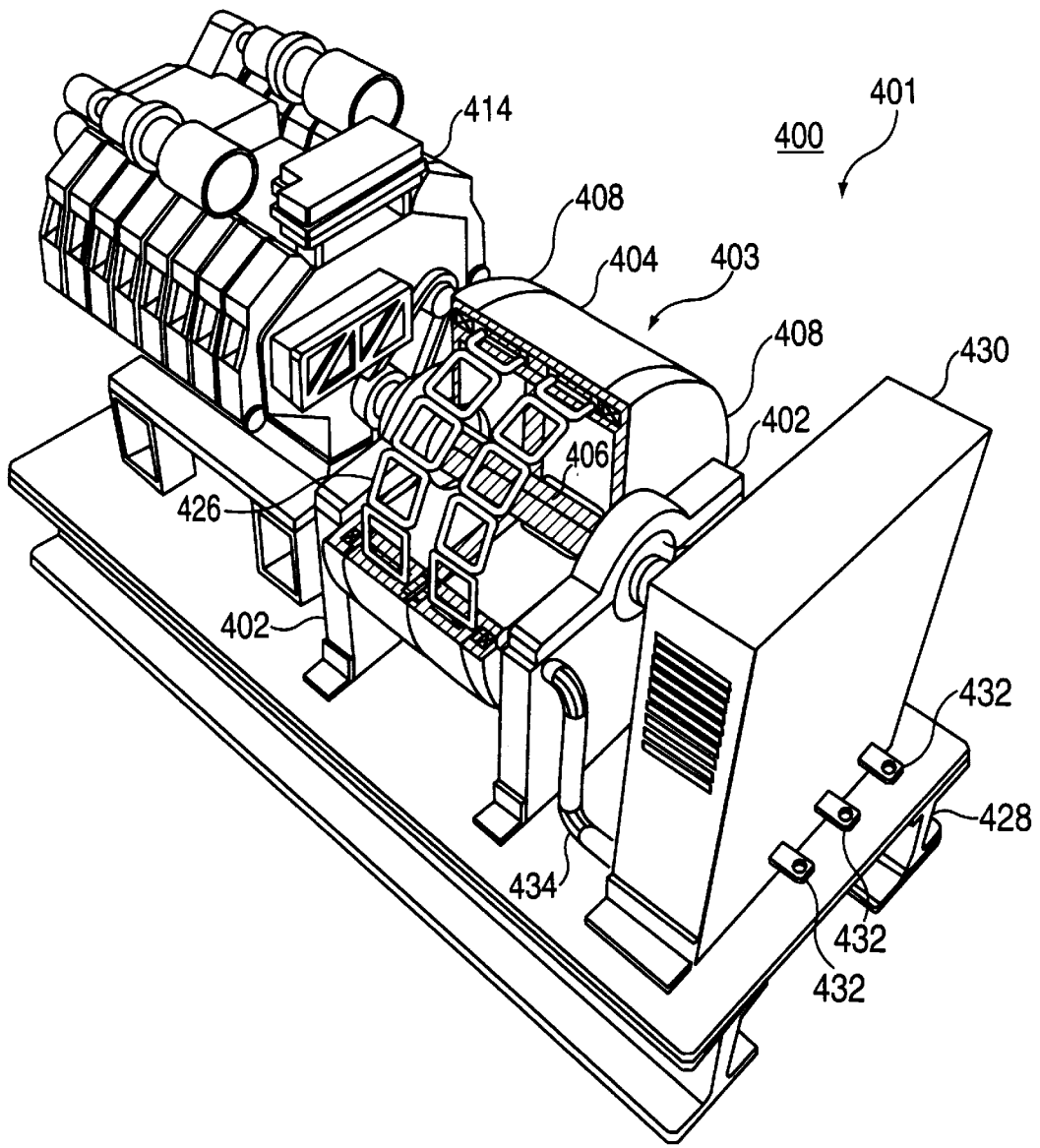
FIG. 8 is a three-dimensional, partial-cutaway, perspective view of a continuous power system that includes an electrical machine cycloconverter constructed in accordance with the principles of the present invention.
Figure 11:
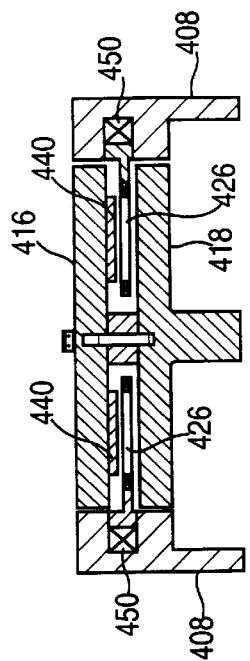
FIG. 11 is a cross-sectional view of the electrical machine cycloconverter of FIGS. 8 and 9 taken along line 11—11.
Figure 9:
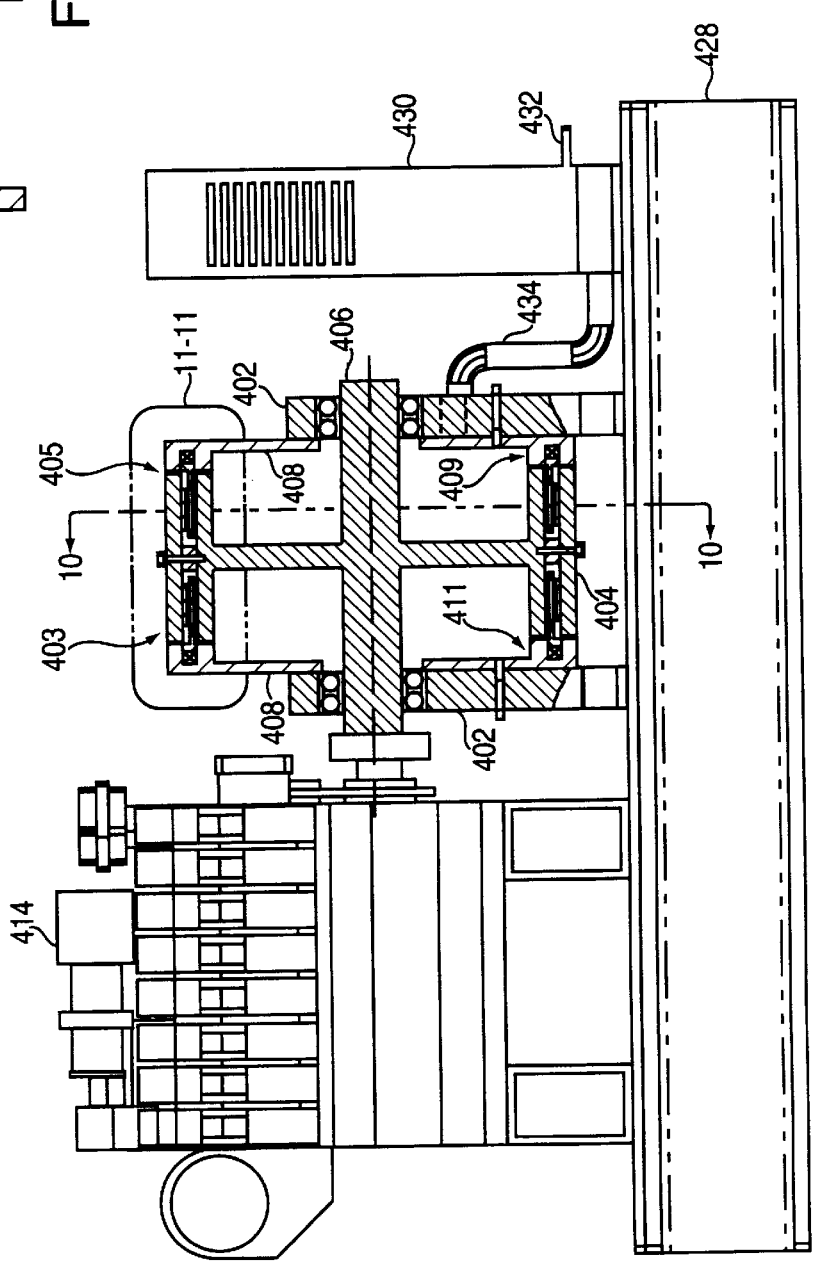
FIG. 9 is a cross-sectional view of the electrical machine cycloconverter of FIG. 8.
Figure 12:
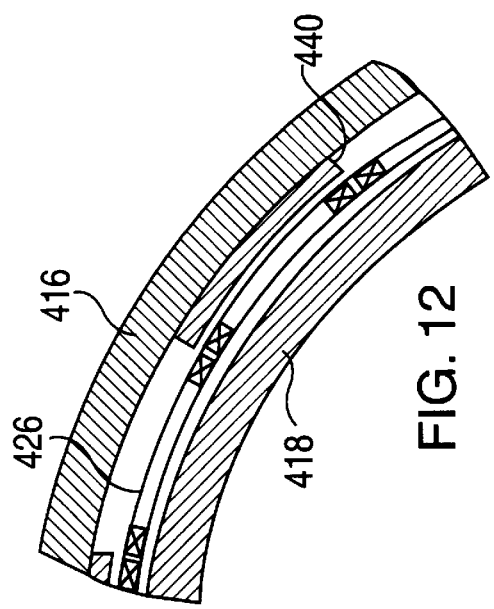
FIG. 12 is a cross-sectional view of the electrical machine cycloconverter of FIGS. 8–10 taken along line 12—12.

Another embodiment of the present invention is shown as continuous power system 400 of FIG. 8. Power system 400 includes electrical machine cycloconverter 401 and prime mover 414. Cycloconverter 401 includes electrical machine 403 and electronics module 430. Prime mover 414 may be any prime mover, but preferably is a reciprocating engine. Electrical machine 403, which is mounted to frames 402, includes rotor 404 that rotates about shaft 406, and stationary assembly 408. Electrical machine 403 (via mounts 402), engine 414 and electronics module 430 all are mounted to frame 428. Electronics module 430, which is connected to the armatures of electrical machine 403 via cable 434, includes three output terminals 432 that may provide a three-phase, relatively low frequency (from about 0–100 Hz) output signal.

Electrical machine 403 is shown in more detail in FIGS. 9–12, as described below. One difference between electrical machine 403 and previously described electrical machine 103 is that electrical machine 403 includes an armature that is split into two, substantially independent sections 403 and 405. Each of sections 403 and 405 includes 18 non-magnetic armature coils—coils formed from a single conductor or turns of wire, such as, for example, litz wire (persons skilled in the art will appreciate that while any armature may be utilized, armatures formed from non-magnetic armature coils provide increased efficiency, and thus, are preferred). Another difference between electrical machines 103 and 403 is that machine 403 utilizes field excitation coils and rotating steel teeth in place of rotating permanent magnets to produce the magnetic flux required to induce a voltage in the armature coils.

Figure 10:
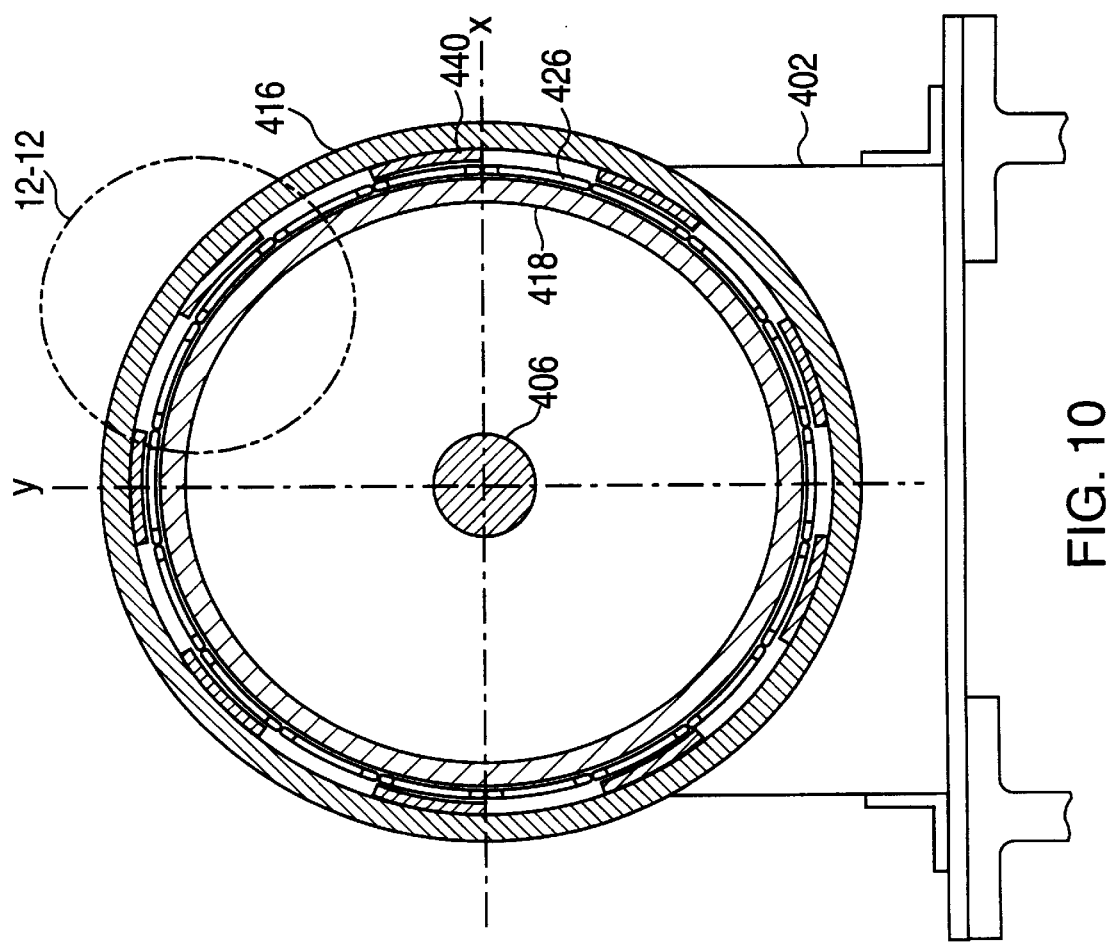
FIG. 10 is a cross-sectional view of the electrical machine cycloconverter of FIGS. 8 and 9 taken along line 10—10.

Rotor 404 includes central shaft 406, outer ring 416 and inner ring 418. Mounted to the inner surface of outer ring 416 are several steel teeth 440 (as shown in FIG. 10, nine teeth 440 are included in machine 403, however, persons skilled in the art will appreciate that the number of teeth utilized may vary depending on the output desired). The steel teeth are configured such that the circumferential arc of one tooth is at least as large as the circumferential arc of one armature coil 426. Thus, as shown in FIG. 10, when nine of armature coils 426 are aligned with the nine teeth 440, the other nine armature coils 426 are aligned with the gaps between teeth 440.

Stationary assembly 408 includes two halves 409 and 411, where one half is provided for each of sections 403 and 405. Each half includes a set of armature coils 426 (as shown in FIG. 10, machine 403 includes eighteen armature coils in each half), and a field coil 450 that, when energized, produces homopolar magnetic flux in the active magnetic air gaps of the corresponding armature section. Stationary assembly 408 is arranged so that armatures coils 426 are located between outer and inner rings 416, 418 and aligned with teeth 440.

Figure 13:
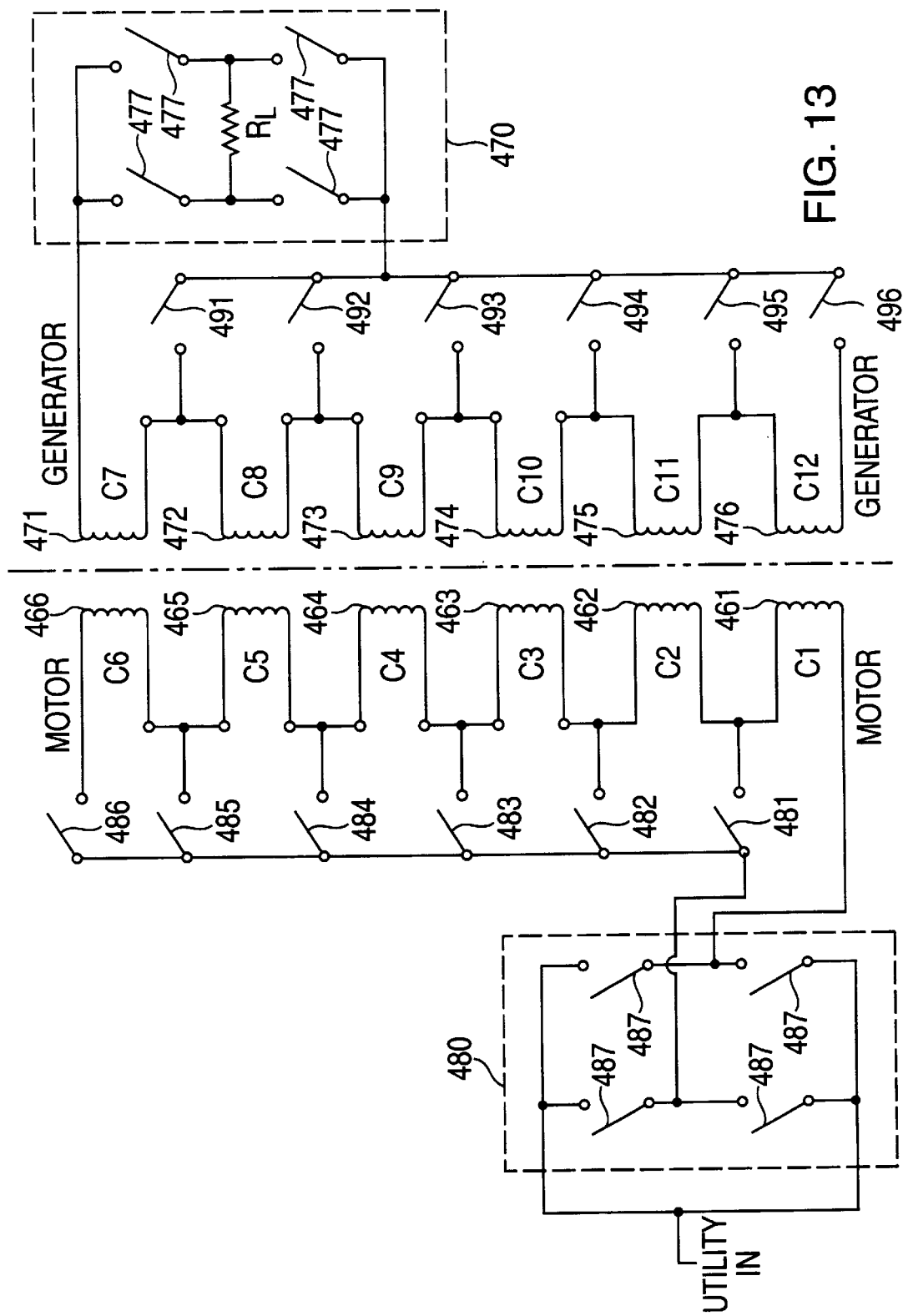
FIG. 13 is a schematic diagram of a portion of the electrical machine cycloconverter of FIG. 8.

FIG. 13 shows a schematic diagram of one portion of electronics module 430, a portion that may be used to produce a single phase output at one of terminals 432. FIG. 13 shows two sets of armature coils that appropriately are labeled "motor" and "generator," and refer generally to sections 409 and 411 of stationary assembly 408. While each section shown in FIG. 13 includes six armature coils such that all three phases could be provided by the eighteen coils of each armature section of electrical machine 403, if only a single-phase device were desired, all eighteen coils could be used with a single inverter circuit to provide an output that even more precisely mimics, for example, an ideal sine wave. Thus, the motor section includes armature coils 461–466 and the generator section includes armature coils 471–476.

Figure 14:
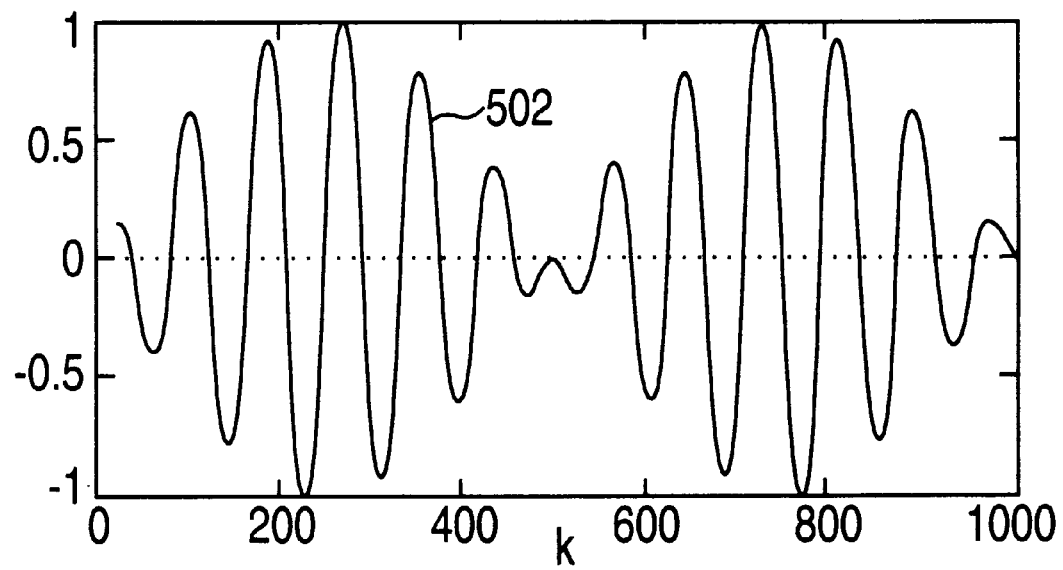
FIG. 14 is a graph showing a complete, non-inverted, output signal of an electrical machine cycloconverter constructed in accordance with the principles of the present invention.
Figure 15:
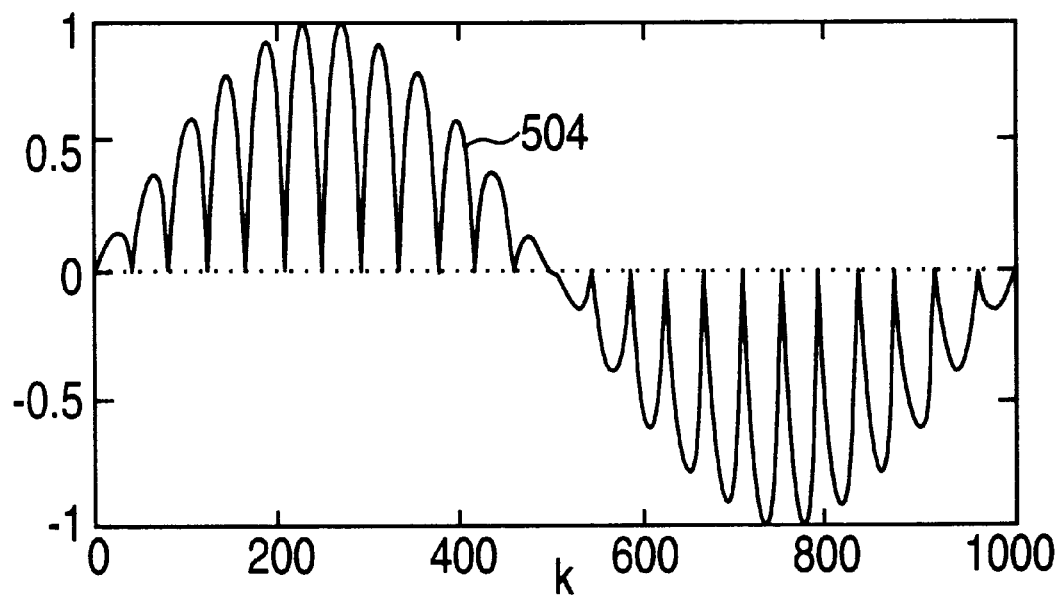
FIG. 15 is a graph showing the output signal of FIG. 14 after it has been inverted.

Switches 481–486 control the motor section, while switches 491–496 control the generator section. Electrical machine 403, in contrast to electrical machine 103, includes a single phase, high frequency section. If bidirectional switches are used, no rectifier section is needed, as is apparent from output curve 502 of FIG. 14 (curve 502 represents the output of the generator section prior to being inverted by inverter circuitry 470). Inverter circuitry 470, as with inverter circuitry 270, may be formed from almost any circuitry that provides the required inversion of the appropriate portions of the output. As shown in FIG. 13, inverter circuitry 470 includes four of switches 477 that are controlled to appropriately invert portions of curve 502 to form output curve 504, as shown in FIG. 15 (the peaks of the signals that form curve 504 generally mimic an ideal sine wave, and can be filtered to produce a near ideal sine wave). One advantage to the field coil embodiment versus the permanent magnet embodiment is that the amplitude of output curve 504 can be adjusted by changing the current in the generator field coil.

The motor section of machine 403 may be controlled utilizing the same switching techniques. For example, coils 461–466, which represent one-third of the motor coils (each of the three single phase modules could be powered by one phase of a three-phase utility input), may be used to cause shaft 406 to rotate. Inverter circuitry 480, which includes four of switches 487, is connected between the utility line input and the motor armature coils. By properly controlling the switching of motor coil switches 481–486 and inverter switches 487, a back emf can be produced at the "utility in" terminals that is synchronized with the line frequency. Changing the switching sequence and/or field coil current enables machine 403 to be operated over a wide range of speeds while being powered by a constant 50 or 60 Hz utility line power. During motor operations, machine 403 does not need a prime mover or generator section. All of switches 477, 481–487 and 491–496 are preferably back-to-back SCR switches, but they may be any kind of semiconductor switch (for example, IGBT switches).

When the motor and generator functions of machine 403 are combined with a prime mover, as shown in FIG. 6, the resultant system is essentially a continuous power system. During normal operation, the motor section of machine 403 is driven by utility power by controlling the sequencing of switches 481–487 so that shaft 406 is rotated at about, for example, 3600 rpm (thereby storing a significant amount of kinetic energy). At the same time, the rotation of shaft 406 and the energizing of the generator section field coils causes the generator section to produce substantially constant low frequency (from about 0–100 Hz, preferably at 50 or 60 Hz) power to the critical load.

Once utility power fails, engine 414 can be brought on-line to drive shaft 406 so that power constantly is provided. During the time that engine 414 is being brought up to speed, the stored kinetic energy or rotor 404 is used to provide power to the critical load. As rotor 404 slows down, the switching sequence and field coil current of the generator section can be adjusted to maintain a substantially constant electrical output (amplitude, frequency and phase). Under such circumstances, engine 414 may be selected to rotate shaft 406 at a speed of about 1800 rpm (so that the stored kinetic energy would be expected to provide power as the rotor spins down from 3600 rpm to 1800 rpm, at which time engine 414 should take over). Once utility power returns, the motor section switches and coils would re-accelerate rotor 404 to 3600 rpm and engine 414 would automatically be shut down.

Figure 16:
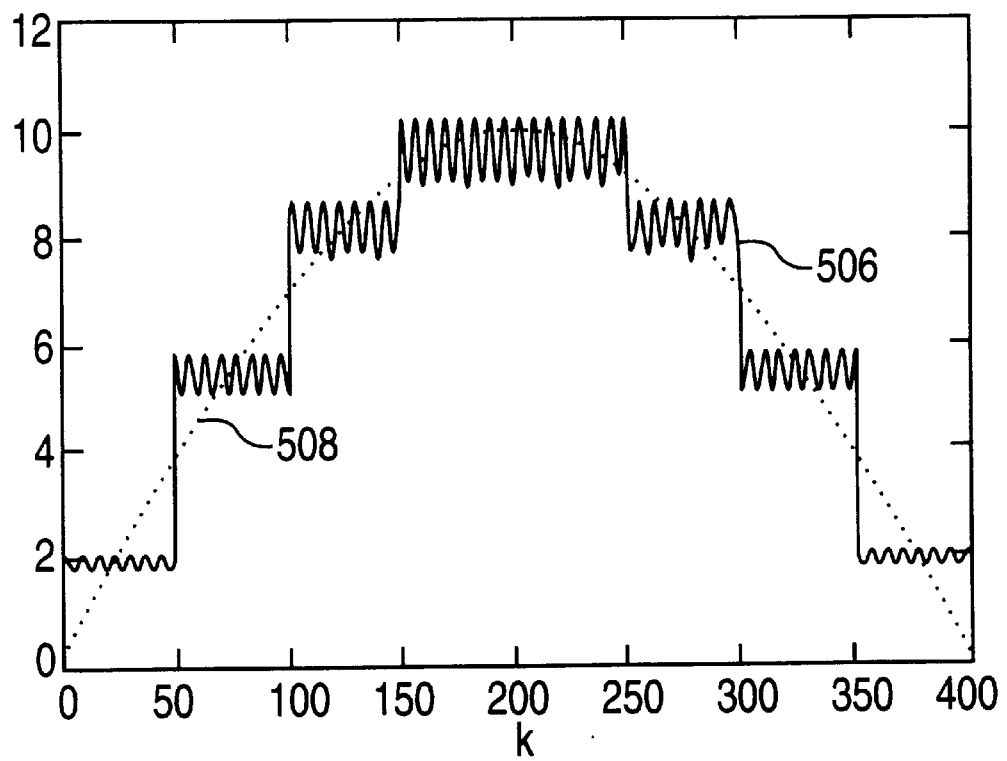
FIG. 16 is a graph showing half of a complete output signal of an alternate electrical machine cycloconverter constructed in accordance with the principles of the present invention.

FIG. 16 shows a graph of a portion of an output signal of an alternate embodiment of the present invention. Curve 506, which closely mimics ideal sine wave portion 508, is produced using a four step device similar to that shown in FIG. 4a and described above. Thus, curve 506 would be produced from a device having four armature coils 126 and four armature coil switches. In contrast to the previously described configurations, in which each armature coil had the same number of turns, curve 506 is produced by having a varying number of turns per coil depending on which part of the sine wave slope the coil contributes to. For example, armature coil 208 might have 16 turns, coil 206 might have 30 turns, coil 204 might have 23 turns and coil 202 might have 12 turns to closely mimic ideal sine wave 508.

Figure 17:
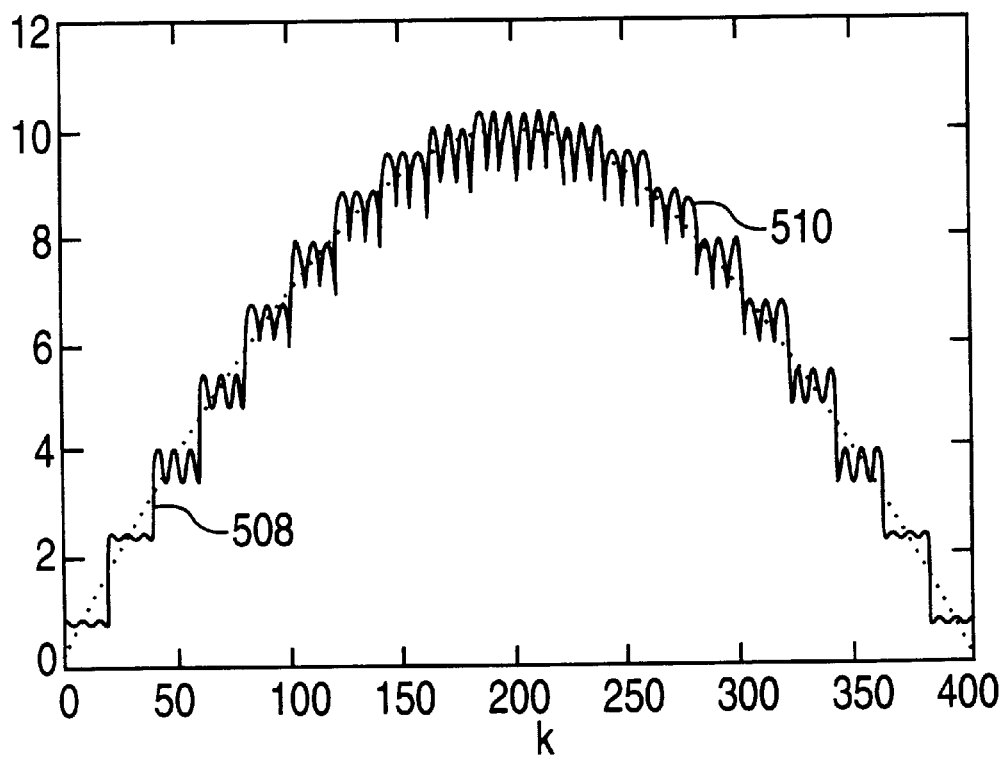
FIG. 17 is a graph showing half of a complete output signal of another alternate electrical machine cycloconverter constructed in accordance with the principles of the present invention.

The average error of curve 506 of FIG. 16 is approximately seven percent. If the average error is too high, additional steps may be introduced, such as a ten step device that was used to produce output signal 510 shown in FIG. 17 (at the expense of increased cost and complexity). In FIG. 17, curve 510 may also be easily compared to ideal sine wave 508.

An additional consideration of armatures of the present invention is the fact that the coils may experience uneven heating. For example, as shown in FIG. 4a, coil 208 will be ON (carrying current) throughout the entire sine wave cycle, while coil 202 will only be ON for twenty-five percent of the time. This may cause uneven heating to occur within the armature that may reduce the maximum power density of the electrical machine cycloconverter. These negative effects may be overcome by connecting one or more additional, similar, coils in parallel with each of coils 208, 218 and 228, to achieve more balanced armature heating. In some cases it also may be desirable to connect one or more additional and similar coils in parallel with coils 206, 216, and 226 to further homogenize armature heating.

While FIG. 16 shows the result of one alternate way to improve the output, it should be noted varying the number of turns in each armature coil may be a somewhat complicated process. Instead of varying the number of turns per armature coil, the voltage steps could be adjusted to be larger during portions of the sine wave having a relatively high slope (thus, the number of turns would remain substantially constant for essentially all of the armature coils of a given device).

Figure 18:
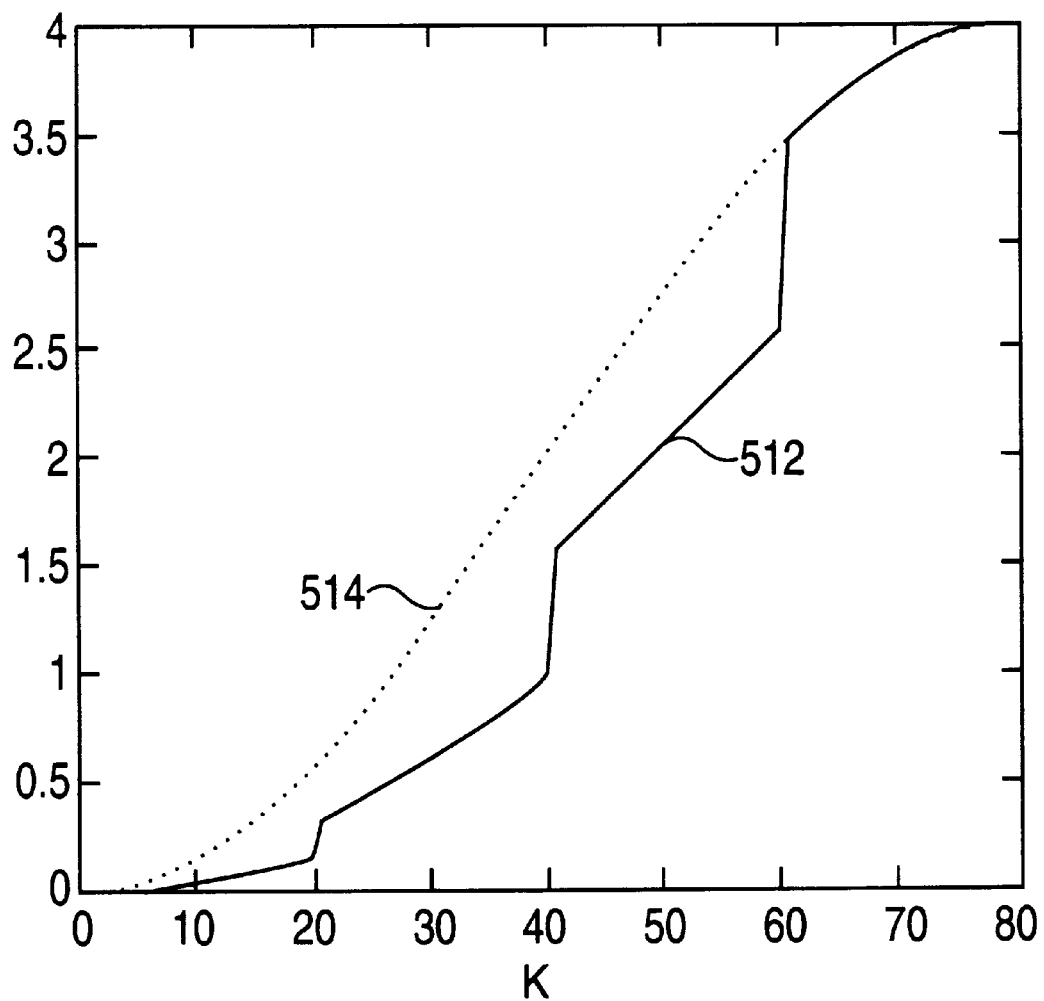
FIG. 18 is a graph showing the efficiency benefit of an alternate method of switching an electrical machine cycloconverter in accordance with the principles of the present invention.

Signal 512 of FIG. 18 shows the power dissipated in the armature coils of the four-step circuitry shown in FIG. 4a relative to the power dissipated in the armature of a conventional electrical machine (see, line 514) during the first quarter of a given sine wave cycle. Less power is dissipated in the FIG. 4a circuit because current flows through fewer armature coils, on average, than a conventional electrical machine armature. Unlike the constant armature resistance of a conventional electrical machine, the armature resistance of the FIG. 4a device is variable and, on average, lower than a conventional machine of similar capacity. Thus, signal 512 shows that the electrical machine cycloconverter of the present invention dissipates less power that conventional devices to perform substantially the same task.

Figure 19:
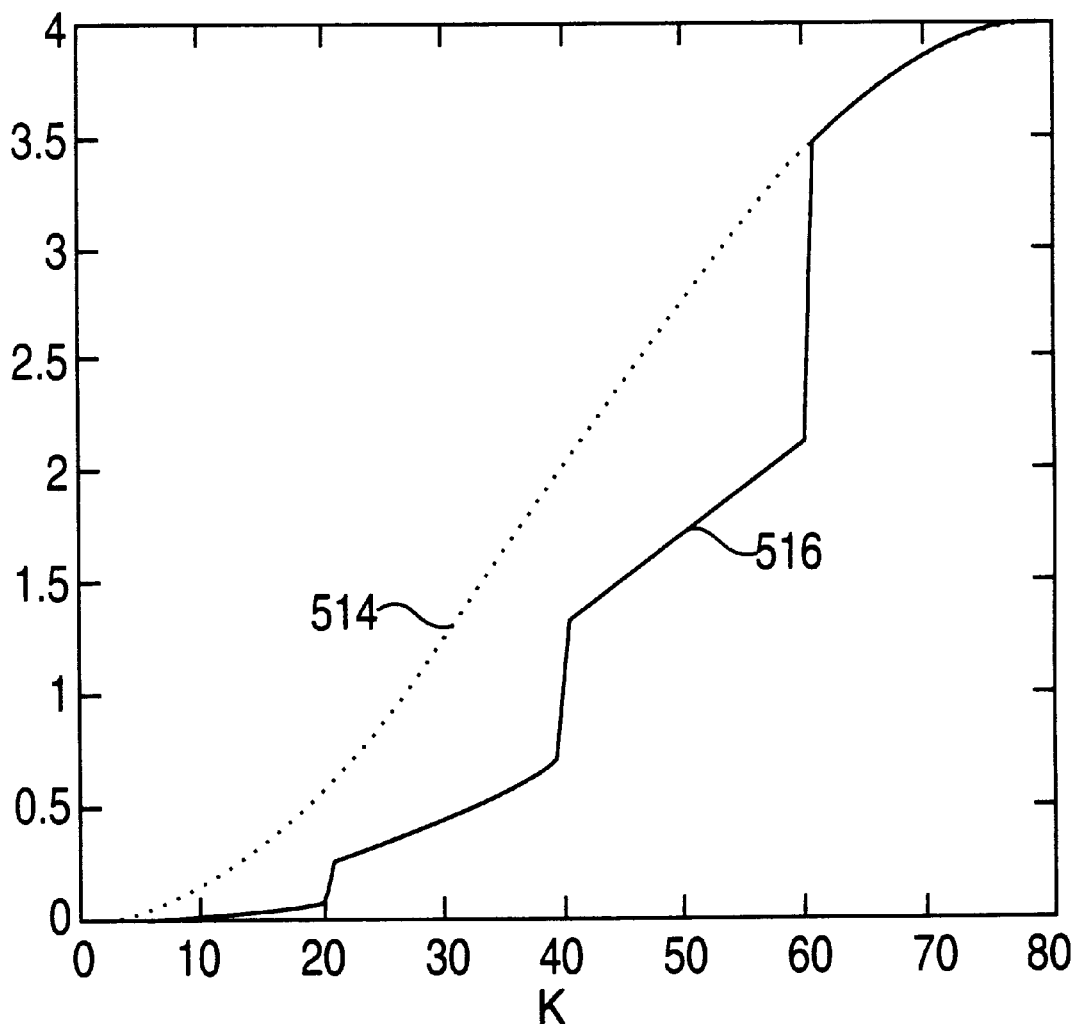
FIG. 19 is a graph showing the efficiency benefit of still another alternate method of switching an electrical machine cycloconverter in accordance with the principles of the present invention.

A further increase in efficiency is shown by the graph in FIG. 19, which also shows curve 514 (power burned by a conventional generator armature). Curve 516 shows that armature losses are reduced from the eighty-two percent of FIG. 18 to about seventy-four percent. The increased efficiency shown by FIG. 18 is the result of switching in armature coils only when needed, and only in series combinations. Alternately, and at an increased cost related at least to semiconductor switches, armature coils could be switched in parallel as well as series to provide the proper sequencing that produces a sine wave mimicking the ideal sine wave. For example, coils 202–208 could be switched in parallel during the first part of the sine wave, then coils 202–206 would be switched in parallel while coil 208 is switched in series with the parallel coils. Next, coils 202–204 would remain in parallel while coils 206 and 208 are switched in series. Finally, all four coils could be switched in series. This process would substantially minimize average armature resistance while still achieving the required steps in voltage.

Figure 20:
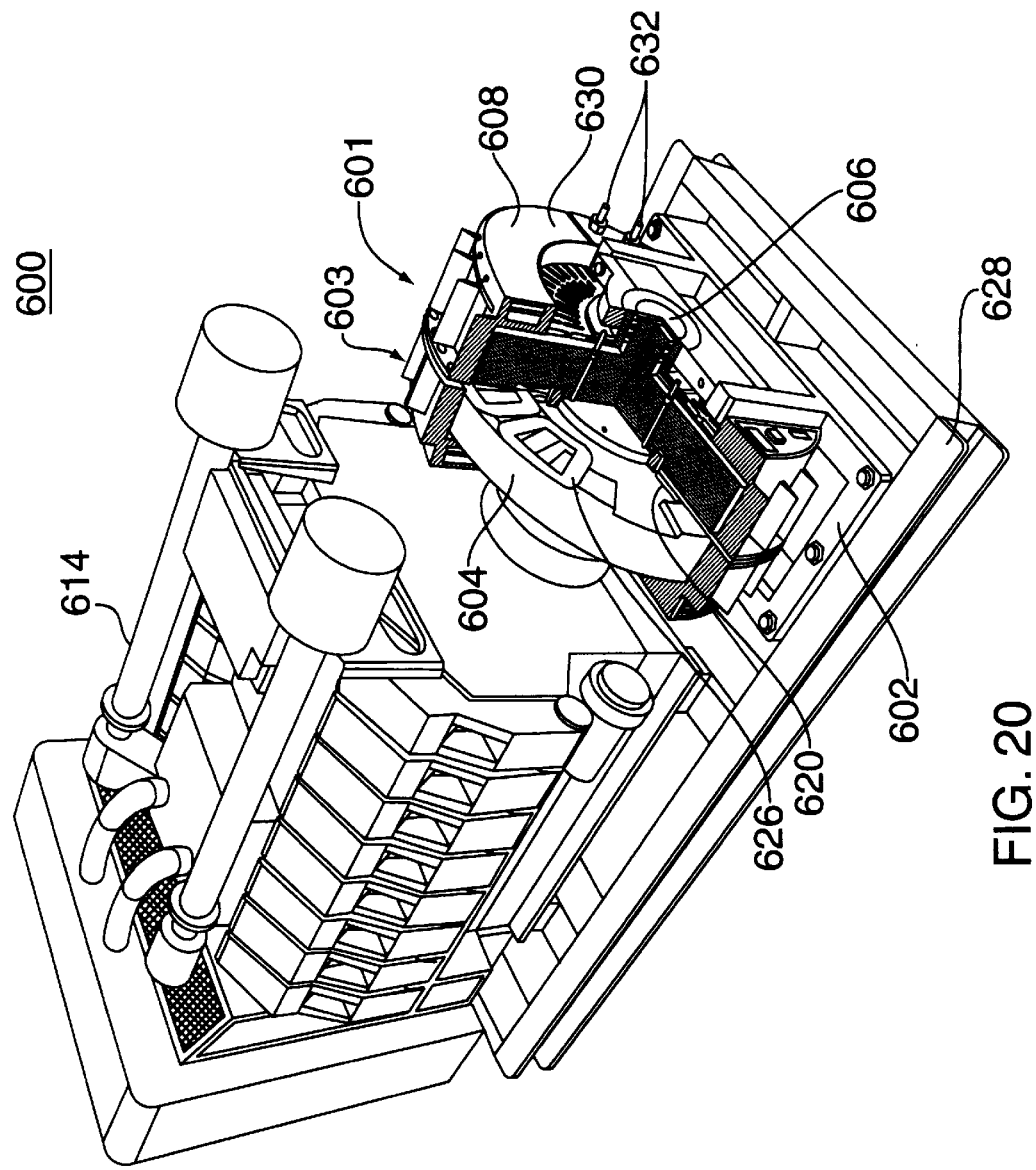
FIG. 20 is a three-dimensional, partial-cutaway, perspective view of another embodiment of an electrical machine cycloconverter constructed in accordance with the principles of the present invention.

Still another embodiment of the present invention is shown as continuous power system 600 of FIG. 20. Power system 600 includes electrical machine cycloconverter 601 and prime mover 614. Cycloconverter 601 includes electrical machine 603 and electronics module 630 that is contained within the housing of electrical machine 603 (as shown in FIGS. 21 and 22). Prime mover 614 may be any prime mover, but preferably is a reciprocating engine. Electrical machine 603, which is mounted to frame 602, includes rotor 604 that rotates about shaft 606, and stationary assembly 608. Electrical machine 603 (via mount 602) and engine 614 both are mounted to frame 628 for convenience.

Portions of electrical machine 603 are shown in more detail in FIGS. 21–22, as described below. The basic principles of electrical machine 603 are substantially the same of those previously described with respect to electrical machines 103 and 403 of FIGS. 1 and 8, respectively. Electrical machines 103 and 603 are similar in that both devices include a single multi-tap armature, while electrical machines 403 and 603 are similar in that both devices utilize field excitation coils and rotating steel teeth in place of rotating permanent magnets to produce the magnetic flux required to induce a voltage in the armature (thus, the description above with respect to machines 103 and 403 applies equally to device 603, as is appropriate). Moreover, persons skilled in the art will appreciate that the armature coils of machine 603 may instead be configured to operate similar to machine 403 by configuring half of the armature coils as a motor and the other half of the armature coils as a generator. In this manner, machine 603 would have separate and independent motor and generator windings that are mounted on a common armature assembly.

Electrical machine 603, on the other hand is a unique configuration due to the flat disk shape of multi-tap armature 626 that has its primary surfaces perpendicular to the axis of shaft 606, and the fact that electronics module 630 is integrated into the housing of electrical machine 603. Moreover, electrical machine 603 could be modified, in accordance with the principles of the present invention, to include a second multi-tap armature for operations similar to that described above with respect to device 403 of FIG. 8.

Electronics module 630, which includes two output terminals 632, provide a single-phase, relatively low frequency (from about 0–100 Hz), output signal. FIGS. 21 and 22 show electronics module 630 (which is not shown in detail in FIG. 20 due to a cover plate) that includes sixteen, easily accessible, semiconductor switches 640. Persons skilled in the art will appreciate that the specific number of switches simply is a matter of design choice depending on the desired output signal. In addition, electronics module 630 includes control circuitry 650 that determines the sequencing of switches 640 and may include, for example, a status indicator light 652, a power-on switch 654 and an external interface connector 656 (that may, for example provide a standard interface such as RS-232), and also may include other standard electronics such as a microprocessor (not shown) or programmable logic device (not shown).

It will be understood that the foregoing is only illustrative of the principles of the invention, and that various modifications can be made by those skilled in the art without departing from the scope and spirit of the invention. For example, although the embodiments shown and described herein include non-magnetic armature coils, persons skilled in the art will appreciate that the benefits of the present invention also may be obtained by using conventional, iron-core, armatures (although with reduced efficiency).

What is claimed is:

1. An electrical machine cycloconverter (101) comprising:
   a rotor (104) that may be rotated about a shaft (106), said rotor (104) comprising a high permeability material;
   a multi-tap armature having a plurality of armature coils (126), at least two of which can be operated in series;
   a member (120) that generates magnetic flux that induces a high frequency AC voltage in said armature coils (126) when said rotor (104) is rotated about said shaft (106); and
   switching circuitry (130) that controls the number of said armature coils (126) connected in series through an electrical load to produce a low frequency AC output signal that includes a plurality of distinct voltage amplitude steps.

2. The cycloconverter (101) of claim 1 further comprising:
   a prime mover (114) that rotates said shaft (106) about an axis.

3. The cycloconverter (101) of claim 1, wherein said prime mover (114) is a reciprocating engine.

4. The cycloconverter (101) of claim 1, wherein said plurality of armature coils (126) comprises first, second, third and fourth armature coils (126).

5. The cycloconverter (101) of claim 4, wherein said switching circuitry (130) energizes one of: said first armature coil (126); said first and second armature coils (126) in series; said first, second and third armature coils (126) in series; and said first, second, third and fourth armature coils (126) in series.

6. The cycloconverter (101) of claim 4, wherein said switching circuitry (130) energizes one of: said first, second, third and fourth armature coils (126) in parallel; said first, second and third armature coils (126) in parallel and said fourth armature coil (126) in series with said parallel energized coils (126); said first and second armature coils (126) in parallel and said third and fourth coils (126) in series with each other and said parallel energized coils (126); and said first, second, third and fourth armature coils (126) in series.

7. The cycloconverter (101) of claim 1, wherein said multi-tap armature (126) is configured in a wye configuration.

8. The cycloconverter (101) of claim 1, wherein said armature coils (126) are non-magnetic, air-core armature coils.

9. The cycloconverter (101) of claim 8, wherein said armature coils (126) are Z-shaped.

10. The cycloconverter (401) of claim 8, wherein said armature coils (426) are substantially square-shaped formed from a pair of end turns and a pair of axial legs that are parallel to the axis of rotation of said shaft (406).

11. The cycloconverter (401) of claim 10, wherein said axial legs have a slight curvature.

12. The cycloconverter (601) of claim 8, wherein said armature coils are substantially flat and are arranged substantially perpendicular to the axis of rotation of said shaft (606).

13. The cycloconverter (601) of claim 1, wherein said rotatable member (604), said multitap armature (626), said magnetic flux inducing member (620) and said switching circuitry (630) all are mounted within a common housing.

14. The cycloconverter (601) of claim 13, wherein said common housing includes terminals (632) for connection to said electrical load.

15. The cycloconverter (101) of claim 1, wherein said flux generating member (120) comprises a plurality of permanent magnets (120) arranged circumferentially about said rotor (104).

16. The cycloconverter (101) of claim 15 further comprising:
   a ring (122) mounted to said rotor (104), said magnets (120) being mounted to said ring (122).

17. The cycloconverter (401) of claim 1, wherein said flux generating member (450) comprises a field coil (450) that, when energized, generates homopolar flux in said rotor (404).

18. The cycloconverter (401) of claim 17, wherein said rotor (404) comprises a first ring (416) and a plurality of steel teeth (440) mounted to said first ring (416) such that said teeth (440) are substantially evenly spaced apart from each other.

19. The cycloconverter (401) of claim 18, wherein said rotor (404) further comprises a second ring (418) having a radius less than said first ring (416), said armatures (426) being mounted between said first and second rings (416, 418).

20. The cycloconverter (401) of claim 1, wherein said multi-tap armature and said flux generating member comprise a generator armature section (403), said cycloconverter (401) further comprising:
   a motor armature section (405), said motor armature section comprising a motor multi-tap armature and a motor flux generating member, said generator and motor armature sections (403, 405) being substantially independent of each other.

21. The cycloconverter (101) of claim 1, further comprising rectification circuitry (260) coupled to said switching circuitry (130) to receive signals from said switching circuitry (130).

22. The cycloconverter (101) of claim 21, further comprising inverter circuitry connected between said rectification circuitry and said electrical load.

23. An electrical machine cycloconverter (101) comprising:
   a multi-tap armature having a plurality of armature coils (126), at least two of which can be connected together in series, each of said armature coils (126) having a pair of output leads;
   a magnetic member (120) that generates flux that induces a high frequency AC voltage in said armature coils (126) upon relative motion between said armature coils (126) and said member (120);

a plurality of semiconductor switches (130) electrically connected to said leads; and control circuitry (130) that turns said switches ON and OFF to vary the number of said armature coils (126) that are connected in series to produce a low frequency, time-varying, output signal that includes a plurality of distinct voltage amplitude steps.

24. The cycloconverter (101) of claim 23, wherein said time-varying output signal is an AC signal.

25. The cycloconverter (101) of claim 23, wherein said multi-tap armature is a stationary member and said magnetic member rotates about an axis.

26. The cycloconverter (101) of claim 23, wherein said multi-tap armature is a non-magnetic armature.

27. The cycloconverter (101) of claim 23, wherein said magnetic member comprises an electromagnet.

28. The cycloconverter (101) of claim 23, wherein said magnetic member comprises a plurality of permanent magnets.

29. The cycloconverter (101) of claim 23 further comprising:

inverter circuitry that transforms said time-varying output signal into a low frequency AC output signal.

30. The cycloconverter (101) of claim 29, wherein said low frequency AC output signal is between about 0 to 100 Hz.

31. The cycloconverter (101) of claim 23, wherein said high frequency AC voltage is between about 300 and 2000 Hz.

32. An electrical machine cycloconverter (101) comprising:

a multi-tap armature having a variable impedance and a plurality of output leads;

a magnetic member (120) that generates magnetic flux that induces a high frequency AC voltage in said armature coils (126) upon relative motion between said armature coils (126) and said member (120);

a plurality of semiconductor switches electrically connected to said leads; and control circuitry (130) that turns said switches ON and OFF to dynamically vary the impedance of said multi-tap armature to produce a low frequency, time-varying, output signal that includes a plurality of distinct voltage amplitude steps.

33. An electrical machine cycloconverter (101) comprising:

a rotatable member (104) that may be rotated about a shaft (106), said rotor comprising a high permeability material;

a multi-tap armature having a plurality of armature coils (126), at least two of which can be operated in series, and a plurality of input leads coupled to an external source of power;

a member (120) that generates magnetic flux that induces a high frequency AC voltage in said armature coils (126) when said rotor (104) is rotated about said shaft (106); and switching circuitry (130) that controls the number of said armature coils (126) connected in series to said external source to cause said rotatable member (104) to rotate at a speed that varies depending on the switching sequence.

34. A continuous power system (100) comprising:

a prime mover (114) that rotates a shaft (106) about an axis;

an electrical machine (103) that comprises at least one multi-tap armature having at least two armature coils (126) that may be connected in series and a member that generates magnetic flux that induces a high frequency AC voltage in said armature coils (126);

switching circuitry (130) electrically coupled to said electrical machine (103) that controls the number of said armature coils (126) that are connected in series to produce a low frequency AC output signal that includes a plurality of distinct voltage steps.

35. The system (100) of claim 34, wherein said flux generating member comprises an electromagnet.

36. The system (100) of claim 34, wherein said flux generating member comprises a plurality of permanent magnets.

37. The system (600) of claim 34, wherein said switching circuitry (630) is housed within said electrical machine (603).

38. The system (400) of claim 34, wherein said electrical machine (403) comprises first and second multi-tap armatures and first and second flux generating members (450), said first multi-tap armature and said first flux generating member (450) operating as a generator (403), said second multi-tap armature and said second flux generating member (450) operating as a motor (405), said generator (403) and said motor (405) sharing said shaft (406) and operating substantially independently of each other.

39. The system (100) of claim 34, wherein said armature coils (126) are configured with respect to each other to substantially form a circle about said axis at a given radius.

40. The system (600) of claim 34, wherein said armature coils (626) are configured with respect to each other so that said coils (626) form a flat disk with its primary surfaces that is substantially perpendicular to said axis.

41. A method of producing a low frequency, time-varying, output signal having a plurality of distinct voltage amplitude steps comprising:

rotating a rotor (104) about a shaft (106);

generating flux that induces current to flow in a plurality of armature coils (126), at least two of which may be connected together in series;

controlling a plurality of semiconductor switches (130) coupled to said armature coils (126) so that the number of said armature coils (126) that are connected in series through an electrical load varies to produce said output signal.

42. The method of claim 41, wherein said induced current generates voltage when a plurality of permanent magnets (120) are rotated about said shaft (106).

43. The method of claim 42, wherein said rotor (104) comprises a first ring (116) and said permanent magnets (120) are mounted to said rotor (104) at a radius less than the outermost radius of said first ring (116).

44. The method of claim 41, wherein generating flux comprises energizing a field coil (450) that produces homopolar flux in said rotor (404), said method further comprising:

generating a voltage by rotating a plurality of steel teeth (440) mounted to said rotor (404) and spaced substantially evenly apart from each other.

45. The method of claim 44, wherein said rotor (404) comprises first and second rings (416, 418), said first ring (416) having a radius greater than said second ring (418), said teeth (440) being mounted to said first ring (416), said armature coils (426) being located between said first and second rings (416, 418).

46. The method of claim 41, wherein said plurality of armature coils (126) comprises first and second armature coils (126) and controlling comprises:

connecting one of: said first armature coil (126); and said first and second armature coils (126) in series; to said electrical load.

47. The method of claim 41, wherein said plurality of armature coils (126) comprises first, second, third and fourth armature coils (126) and controlling comprises:

connecting one of: said first armature coil (126); said first and second armature coils (126) in series; said first, second and third armature coils (126) in series; and said first, second, third and fourth armature coils (126) in series; to said electrical load.

48. The method of claim 41, wherein said plurality of armature coils (126) comprises first and second armature coils (126) and controlling comprises:

connecting one of: said first and second armature coils (126) in parallel; and said first and second armature coils (126) in series; to said electrical load.

49. The method of claim 41, wherein said plurality of armature coils (126) comprises first, second, third and fourth armature coils (126) and controlling comprises:

connecting one of: said first, second, third and fourth armature coils (126) in parallel; said first, second and third armature coils (126) in parallel and said fourth armature coil (126) in series with said parallel energized coils (126); said first and second armature coils (126) in parallel and said third and fourth coils (126) in series with each other and said parallel energized coils (126); and said first, second, third and fourth armature coils (126) in series; to said electrical load.

50. The method of claim 41, wherein controlling comprises:

receiving at least one signal from said armature coils (126);

rectifying said received signal; and inverting said rectified signal to produce said signal that includes a plurality of distinct voltage amplitude steps.

51. The method of claim 41, wherein controlling comprises:

connecting at least three sets of armature coils (126) together in a wye configuration, each set comprising at least two coils (126) having an electrical output in phase with each other; and coupling varying numbers of said coils (126) in each set in series to a common pair of conductors, said conductors being coupled to a low frequency AC load through inverter circuitry.

\* \* \* \* \*